US009817957B1

(12) United States Patent
Molina-Markham et al.

(10) Patent No.: US 9,817,957 B1
(45) Date of Patent: Nov. 14, 2017

(54) ACCESS MANAGEMENT BASED ON ACTIVE ENVIRONMENT COMPRISING DYNAMICALLY RECONFIGURABLE SETS OF SMART OBJECTS

(71) Applicant: EMC Corporation, Hopkinton, MA (US)

(72) Inventors: Andres D. Molina-Markham, Cambridge, MA (US); Kevin D. Bowers, Melrose, MA (US); Nikolaos Triandopoulos, Arlington, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 63 days.

(21) Appl. No.: 14/731,015

(22) Filed: Jun. 4, 2015

(51) Int. Cl.
*G06F 21/00* (2013.01)
*G06F 21/31* (2013.01)
*G06N 99/00* (2010.01)
*G06F 21/57* (2013.01)

(52) U.S. Cl.
CPC .............. *G06F 21/31* (2013.01); *G06F 21/57* (2013.01); *G06N 99/005* (2013.01); *G06F 2221/034* (2013.01)

(58) Field of Classification Search
CPC ..... G06F 21/31; G06F 21/57; G06F 2221/034
USPC ............. 713/182, 171, 189; 709/223; 726/4; 380/255
See application file for complete search history.

(56) References Cited

U.S. PATENT DOCUMENTS

| 8,787,902 | B2 * | 7/2014 | Kim ...................... H04W 12/06 455/426.1 |
| 8,918,844 | B1 | 12/2014 | Friedman et al. |
| 9,491,571 | B2 * | 11/2016 | Karp ...................... G05B 15/02 |
| 2005/0237185 | A1 | 10/2005 | Brown et al. |

(Continued)

FOREIGN PATENT DOCUMENTS

WO 2014153532 A2 9/2014

OTHER PUBLICATIONS

Apple, "OS X Mavericks," Core Technologies Overview, http://images.apple.com/media/us/osx/2013/docs/OSX_Mavericks_Core_Technology_Overview.pdf, Oct. 2013, 36 pages.

(Continued)

*Primary Examiner* — Eric W Shepperd
*Assistant Examiner* — Feliciano Mejia
(74) *Attorney, Agent, or Firm* — Ryan, Mason & Lewis, LLP

(57) ABSTRACT

A processing device comprises a processor coupled to a memory and is configured to predict or otherwise determine that a user will utilize a target application on a user device in involvement with a particular set of smart objects, to request cryptographic material for activating the smart objects of the set, to receive the cryptographic material responsive to the request, and to utilize the cryptographic material to activate the smart objects. Each of the activated smart objects provides a verifier with a proof of involvement with the user device. The verifier controls user access to the target application based at least in part on the proofs provided by the activated smart objects. The determining, requesting, receiving and utilizing operations in some embodiments are performed by a learning agent running on the processing device. The learning agent illustratively (Continued)

includes functionality for learning target application access behavior of the user over time.

24 Claims, 9 Drawing Sheets

(56) References Cited

U.S. PATENT DOCUMENTS

| | | | |
|---|---|---|---|
| 2011/0195665 A1 | 8/2011 | Friedlaender | |
| 2011/0209195 A1 | 8/2011 | Kennedy | |
| 2011/0225426 A1 | 9/2011 | Agarwal et al. | |
| 2013/0291056 A1 | 10/2013 | Gaudet et al. | |
| 2013/0303143 A1 | 11/2013 | Schrader et al. | |
| 2013/0316644 A1 | 11/2013 | Hirabayashi et al. | |
| 2014/0024392 A1* | 1/2014 | Su | H04W 4/025 455/456.2 |
| 2014/0283018 A1 | 9/2014 | Dadu et al. | |
| 2014/0289835 A1 | 9/2014 | Varshaysky et al. | |
| 2014/0297747 A1 | 10/2014 | Othily et al. | |
| 2014/0324591 A1 | 10/2014 | Kim et al. | |
| 2014/0379804 A1* | 12/2014 | Wang | H04L 67/104 709/204 |
| 2015/0050886 A1 | 2/2015 | Donaldson | |
| 2015/0072663 A1* | 3/2015 | Chande | G06Q 10/10 455/414.1 |
| 2015/0269383 A1* | 9/2015 | Lang | G06F 21/57 726/1 |
| 2015/0312041 A1* | 10/2015 | Choi | H04L 9/3231 713/175 |
| 2016/0087955 A1* | 3/2016 | Mohamad Abdul | G06F 8/60 726/7 |
| 2016/0116343 A1* | 4/2016 | Dixon | G01J 1/44 250/342 |

OTHER PUBLICATIONS

M.Y. Becker et al., "SecPAL: Design and Semantics of a Decentralized Authorization Language," Journal of Computer Security—Digital Identity Management (DIM), Dec. 2010, pp. 619-665, vol. 18, No. 4.

M.D. Corner et al., "Zero-Interaction Authentication," 8th Annual International Conference on Mobile Computing and Networking (MobiCom), Sep. 2002, 11 pages.

S. Egelman et al., "Are You Ready to Lock? Understanding User Motivations for Smartphone Locking Behaviors," ACM SIGSAC Conference on Computer and Communications Security (CCS), Nov. 2014, pp. 750-761.

T. Feng et al., "TIPS: Context-Aware Implicit User Identification Using Touch Screen in Uncontrolled Environments," 15th Workshop on Mobile Computing Systems and Applications (HotMobile), Article No. 9, Feb. 2014, 6 pages.

D. Gafurov et al., "Biometric Gait Authentication Using Accelerometer Sensor," Journal of Computers, Oct.-Nov. 2006, pp. 51-59, vol. 1, No. 7.

Google, "Android 5.0, Lollipop—A Sweet New Take on Android," http://www.android.com/versions/lollipop-5-0/, Nov. 2014, 6 pages.

Y. Gurevich et al., "DKAL: Distributed-Knowledge Authorization Language," IEEE 21st Computer Security Foundations Symposium (CSF), Jun. 2008, pp. 149-162.

M. Jakobsson et al., "Implicit Authentication for Mobile Devices," 4th USENIX Conference on Hot Topics in Security, Aug. 2009, 6 pages.

Luke Korth, "Dislock," https://play.google.com/store/apps/details?id=com.lukekorth.pebblelocker&hl=en, Nov. 14, 2014, 3 pages.

B. Laurie et al., "Choose the Red Pill and the Blue Pill—A Position Paper," Workshop on New Security Paradigms (NSPW), Sep. 2008, pp. 127-133.

S. Mare et al., "ZEBRA: Zero-Effort Bilateral Recurring Authentication," IEEE Symposium on Security and Privacy (SP), May 2014, pp. 705-720.

E. Shi et al., "Implicit Authentication Through Learning User Behavior," 13th International Conference on Information Security (ISC), Oct. 2010, pp. 99-113.

S. Sinclair et al., "Preventative Directions for Insider Threat Mitigation Via Access Control," Insider Attack and Cyber Security, Advances in Information Security, Jan. 2008, pp. 165-194, vol. 39.

S.W. Smith et al., "Healthcare Information Technology's Relativity Problems: a Typology of How Patients' Physical Reality, Clinicians' Mental Models, and Healthcare Information Technology Differ," Journal of the American Medical Informatics Association, Jan.-Feb. 2014, pp. 117-131, vol. 21, No. 1.

Frank Stajano, "Pico: No More Passwords!*," 19th International Conference on Security Protocols (SP), Aug. 2011, pp. 49-81.

C. Bo et al., "SilentSense: Silent User Identification Via Touch and Movement Behavioral Biometrics," 19th Annual International Conference on Mobile Computing and Networking (MobiCom), Sep.-Oct. 2013, pp. 187-190.

J. Bonneau et al., "The Quest to Replace Passwords: A Framework for Comparative Evaluation of Web Authentication Schemes," IEEE Symposium on Security and Privacy (SP), May 2012, pp. 553-567.

A. De Luca et al., "Touch Me Once and I Know It's You! Implicit Authentication Based on Touch Screen Patterns," SIGCHI Conference on Human Factors in Computing Systems (CHI), May 2012, pp. 987-996.

Y. Gurevich et al., "DKAL 2—A Simplified and Improved Authorization Language," Microsoft Research, Tech Report MSR-TR-2009-11, Feb. 2009, 26 pages.

J.-B. Jeannin et al., "DKAL*: Constructing Executable Specifications of Authorization Protocols," Engineering Secure Software and Systems, Mar. 2013, pp. 139-154.

H. Khan et al., "A Comparative Evaluation of Implicit Authentication Schemes," 17th International Symposium on Research in Attacks, Intrusions and Defenses (RAID), Lecture Notes in Computer Science (LNCS), Sep. 2014, pp. 255-275, vol. 8688, Gothenburg, Sweden.

nmap.org, "NMAP: Network Mapper," http://nmap.org/, Mar. 2015, 3 pages.

Torben Pryds Pedersen, "Non-Interactive and Information-Theoretic Secure Verifiable Secret Sharing," Advances in Cryptology (CRYPTO), Lecture Notes in Computer Science (LNCS), May 2001, pp. 129-140, vol. 576.

Adi Shamir, "How to Share a Secret," Communications of the ACM, Nov. 1979, pp. 612-613, vol. 22, No. 11.

F. Stajano et al., "Bootstrapping Adoption of the Pico Password Replacement System," 22nd International Workshop, Proceedings of Security Protocols XXII, Mar. 2014, pp. 187-196, Cambridge, United Kingdom.

Q. Stafford-Fraser et al., "To Have and Have Not: Variations on Secret Sharing to Model User Presence," ACM International Joint Conference on Pervasive and Ubiquitous Computing (UbiComp): Adjunct Publication, Sep. 2014, pp. 1313-1320.

S. Uellenbeck et al., "Quantifying the Security of Graphical Passwords: The Case of Android Unlock Patterns," ACM SIGSAC Conference on Computer & Communications Security (CCS), Nov. 2013, pp. 161-172, Berlin, Germany.

C.J.C.H. Watkins et al., "Q-Learning," Machine Learning, 1992, pp. 279-292, vol. 8, No. 3-4.

* cited by examiner

ACCESS MANAGEMENT BASED ON ACTIVE ENVIRONMENT COMPRISING DYNAMICALLY RECONFIGURABLE SETS OF SMART OBJECTS

FIELD

The field relates generally to information security, and more particularly to techniques for controlling access to user devices.

BACKGROUND

It is typical for a user to have access to several distinct user devices including at least one desktop, laptop or tablet computer terminal and a mobile telephone. The user may switch between such devices frequently throughout the day.

Access management in such contexts can be problematic. For example, authentication based on passwords or gestures can weaken security because users tend to choose weak passwords or gestures in order to gain convenience. Moreover, such approaches impose cognitive costs that negatively impact usability.

Physical biometric approaches such as fingerprint scanning or facial recognition often require expensive equipment and can raise privacy concerns. Other types of biometric approaches such as implicit authentication based on behavioral biometrics arguably avoid these issues, but attackers can defeat such arrangements by imitating user behavior.

Other approaches rely on the presence of one or more physical tokens to gain access to user device, but such approaches can be unduly burdensome because users need to carry a particular predetermined set of one or more physical tokens with them in order to obtain access to their devices.

Deauthentication is also an issue in these and other contexts. For example, automatic relocking of user devices after a timeout period of non-use is generally based on user-controllable settings and, again in order to gain convenience, users will tend to set such timeout periods to extended lengths that can undermine security.

Also, in some automatic authentication approaches, manual deauthentication is required, which negatively impacts usability.

Accordingly, a need exists for techniques that address the security and usability problems associated with conventional access management.

SUMMARY

Illustrative embodiments of the present invention provide access management for one or more user devices through the use of what is referred to herein as an "active environment" that comprises dynamically reconfigurable sets of smart objects for a given user. In some embodiments, a user gains access to a target application on a given user device if his or her current active environment of smart objects allows such access. Such arrangements can advantageously provide improved security and usability. For example, the above-noted issues associated with passwords, gestures and biometrics are avoided. Moreover, the inconvenience associated with having to carry predetermined sets of physical tokens is eliminated. The active environment also facilitates deauthentication by reliably locking the target application in situations in which the user is not likely to utilize that application.

In one embodiment, a processing device comprises a processor coupled to a memory and is configured to determine that a user will utilize a target application on a user device in involvement with a particular set of smart objects, to request cryptographic material for activating the smart objects of the set, to receive the cryptographic material responsive to the request, and to utilize the cryptographic material to activate the smart objects. Each of the activated smart objects provides a verifier with a proof of involvement with the user device. The verifier controls user access to the target application based at least in part on the proofs provided by the activated smart objects.

The determining, requesting, receiving and utilizing operations in this embodiment may be performed by a learning agent running on the processing device.

In another embodiment, a processing device comprises a processor coupled to a memory and is configured to determine that a user will utilize a target application on a user device in involvement with a particular set of smart objects, and to provide the determination to a verifier. The verifier utilizes the determination to obtain a proof of involvement with the user device from each of the smart objects of the set, and controls user access to the target application based at least in part on the obtained proofs.

The determining and providing operations in this embodiment may be performed by a learning agent running on the processing device.

In some embodiments, determining that a user will utilize a target application on a user device in involvement with a particular set of smart objects comprises generating a prediction that the user will utilize the target application on the user device in involvement with the particular set of smart objects. Other types of determinations, not necessarily involving generation of a prediction, may be made in other embodiments. For example, the learning agent can be configured to determine a particular set of smart objects responsive to an event such as the user requesting access to the target application.

The learning agent in some embodiments is configured to permit access to the target application in situations in which the user is likely to utilize the target application and to deny access to the target application in situations in which the user is not likely to utilize the target application. The learning agent illustratively includes functionality for learning target application access behavior of the user over time.

Embodiments of the invention can facilitate the implementation of highly secure and usable access management functionality in a wide variety of different contexts involving different arrangements of user devices and other smart objects.

These and other illustrative embodiments described herein include, without limitation, apparatus, systems, methods and processor-readable storage media.

DETAILED DESCRIPTION

Illustrative embodiments of the present invention will be described herein with reference to exemplary information processing systems and associated computers, mobile telephones or other types of processing devices. It is to be appreciated, however, that the invention is not restricted to use with the particular illustrative system and device configurations shown. Accordingly, the term "information processing system" as used herein is intended to be broadly construed, so as to encompass, for example, any processing system comprising at least one processing platform, including systems comprising virtual machines, containers or other cloud infrastructure.

Figure 1:
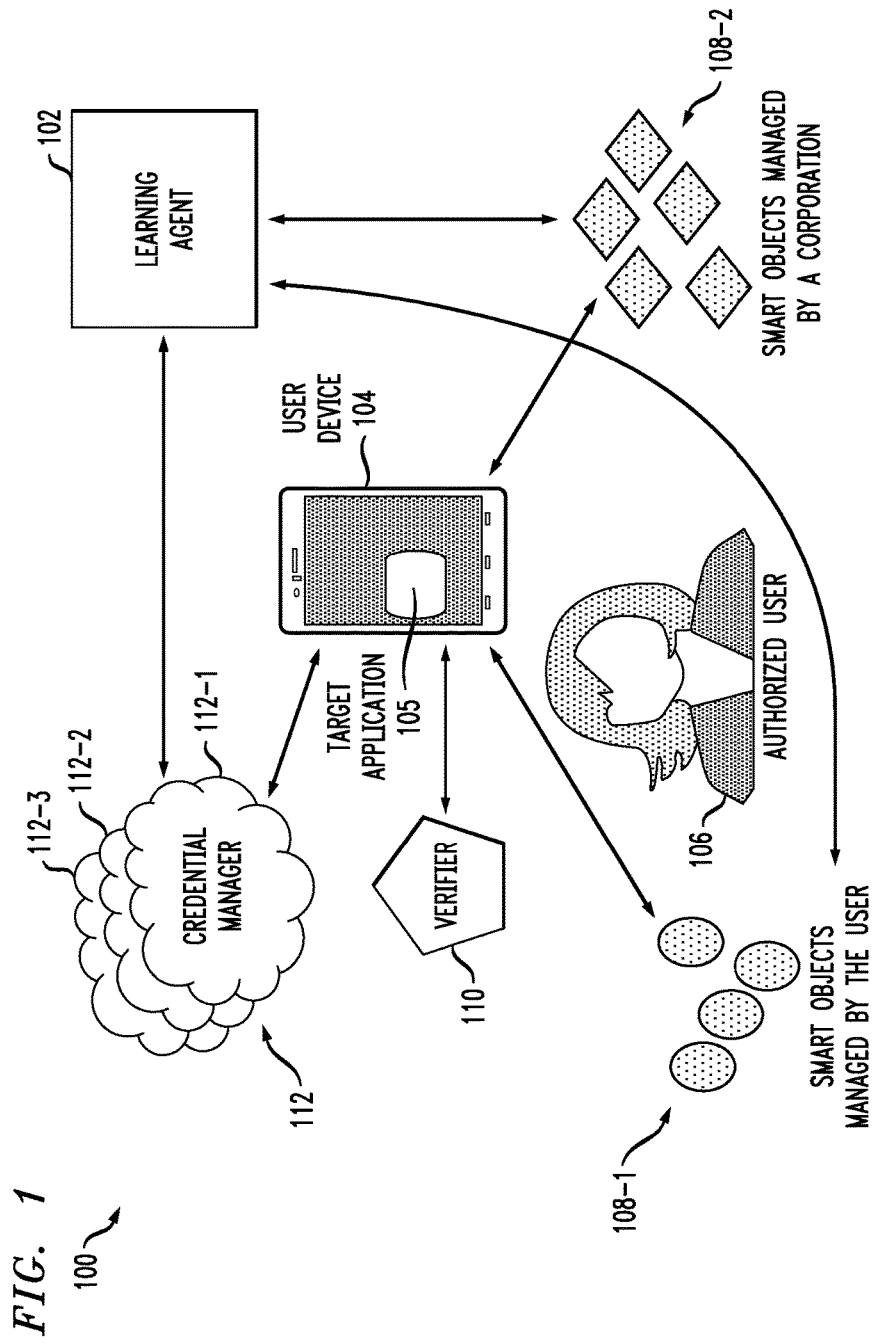
FIG. 1 shows an information processing system configured to provide access management based on an active environment comprising dynamically reconfigurable sets of smart objects in an illustrative embodiment of the invention.

FIG. 1 shows an information processing system 100 configured in accordance with an illustrative embodiment of the invention. The system 100 in this embodiment comprises a learning agent 102 and a user device 104. The user device 104 runs a target application 105. At least one of the user device 104 and the target application 105 is associated with an authorized user 106. Also included in the system 100 is a set of smart objects 108, which may comprise respective additional user devices or other types of smart objects. The system 100 further comprises a verifier 110 and a credential manager 112. The system 100 is therefore implemented as a distributed system that includes multiple devices, including at least one user device and a plurality of smart objects 108. As will be described in more detail below, the system 100 leverages these multiple devices in order to provide enhanced security and usability in access management.

The term "user" in the context of the present embodiment is assumed to refer to a human user associated with at least one of the user device 104 and the target application 105, illustratively the authorized user 106, although other types and arrangements of users may be present in other embodiments.

Also, the term "user device" as used herein is intended to be broadly construed to encompass, for example, any device that is operated or otherwise configured at least in part responsive to input received from or associated with a user. A given user device referred to herein need not be associated with an authorized user, or with any particular user, but could be, for example, a device that is time-shared by multiple distinct users. Examples of such user devices include a rental automobile or a smart television in a hotel room. Numerous other user device arrangements are possible.

The set of smart objects 108 illustratively comprises a first subset of smart objects 108-1 that are managed or otherwise controlled by the user 106 and a second subset of smart objects 108-2 that are managed or otherwise controlled by an entity other than the user 106, in this case a corporation, such as a corporation that employs the user 106.

The credential manager 112 in this embodiment comprises multiple distinct portions. These illustratively include at least portions 112-1, 112-2 and 112-3, although the actual number of portions could be much larger. Such portions are assumed to represent respective separate credential managers storing respective separate sets of user credentials and corporate credentials. The term "credential manager" as used herein is intended to broadly construed so as to encompass these and other arrangements of multiple separate credential managers, each possibly associated, for example, with a different user, corporation or other entity. It should be understood, however, that a given credential manager need not be separated into multiple separate credential managers for storing sets of credentials for respective entities, and instead credentials for multiple entities could be stored in a single credential manager.

The learning agent 102, verifier 110 and credential manager 112 are illustratively implemented on one or more processing platforms each comprising at least one processing device that includes a processor coupled to a memory. For example, each of the elements 102, 110 and 112 can be implemented on a different processing platform. More specifically, such elements can be implemented as respective cloud applications running on cloud servers, or as applications running on user devices such as a mobile telephone or a smart watch. Alternatively, two or more of these system elements can be implemented on a common processing platform. For example, the verifier 110 can be implemented as a component running on the same processing platform as the credential manager 112. An arrangement of this type will be described below in conjunction with FIG. 8. Other examples of different arrangements of distributed system elements can be seen in FIGS. 6 and 7. It is also possible for different portions of a given one of elements 102, 110 and 112 to be implemented in a distributed manner over multiple distinct platforms or processing devices.

The learning agent 102 in some embodiments is configured to generate a prediction that the authorized user 106 will utilize the target application 105 on the user device 104 in involvement with a particular set of smart objects 108. The smart objects 108 illustratively form at least a portion of an "active environment" of the authorized user 106 that is utilized to control access to the target application 105. For example, in some implementations of the FIG. 1 embodiment, the learning agent 102 generates the prediction that the target application 105 will be utilized with the involvement of a particular set of smart objects, and provides the prediction to the verifier 110. The verifier 110 then attempts to obtain proof of involvement from these smart objects. If the verifier fails to obtain such proof of involvement from each of the identified smart objects, the verifier denies access to the target application 105. Each of the smart objects in such an arrangement can enforce one or more access control policies independently of any such policies enforced by the learning agent, the verifier and the credential manager.

Accordingly, one or more of the elements 102, 104, 105, 108, 110 and 112 may comprise respective policy engines. Such policy engines are utilized by the respective system elements to implement one or more policies relating to access management based on the active environment of the authorized user 106. The policy engines in respective ones of the system elements are illustratively configured to implement policies for use in controlling access to the target application 105. The policy engines can also be utilized to determine conditions under which deauthentication should be performed, where such deauthentication in the present embodiment illustratively involves controllably re-locking the target application 105 after it has previously been unlocked.

Embodiments therefore allow for the specification of access control policies that delimit the active environment boundaries of a specific user. Boundaries can be spatial, temporal, or more generally contextual. Policies can be dynamic, and therefore the active environment boundaries can change over time to optimize security and usability. Such an arrangement avoids problems that might otherwise arise if an adversary gains even temporary possession of a sufficient number of the smart objects.

As noted above, in some embodiments, the learning agent 102 determines that the user 106 will utilize the target application 105 on user device 104 in involvement with a particular set of smart objects 108 by generating a prediction that the user will utilize the target application on the user device in involvement with the particular set of smart objects. However, other types of determinations, not necessarily involving generation of a prediction, may be made in other embodiments. For example, the learning agent 102 can be configured to determine the particular set of smart objects responsive to an event such as the user requesting access to the target application. Additional or alternative events may trigger such determinations. References herein to generation of a prediction in conjunction with illustrative embodiments should therefore be viewed as examples and not considered limiting in any way.

The learning agent 102 in some embodiments is configured to permit access to the target application 105 in situations in which the user 106 is likely to utilize the target application and to deny access to the target application in situations in which the user 106 is not likely to utilize the target application.

The learning agent 102 illustratively includes functionality for learning target application access behavior of the user 106 over time. For example, the learning agent 102 may implement reinforcement learning functionality in order to learn which smart objects to activate in order to maximize security and usability. As a result, minimal user effort and involvement is required to configure the active environment.

As noted above, the active environment leverages a distributed access control framework that allows for the specification of access control policies that dictate the conditions under which specific smart objects may be activated. Different access control policies can be deployed at different system elements, including the learning agent 102, the smart objects 108, the verifier 110 and the credential manager 112.

The active environment in the FIG. 1 embodiment is configured to protect the target application 105 against illegitimate use and to grant access to the target application for legitimate use. As noted above, the target application 105 runs on user device 104. It may be assumed that both the user device 104 and the target application 105 are associated with authorized user 106. Unless otherwise specified, we will refer to this application-device-user triple as the target application or simply application. Accordingly, the term "target application" is intended to be broadly construed and may encompass any functionality of the user device that is subject to access control. Also, terms such as "unlock" and "lock" when used in conjunction with a target application are intended to be broadly construed as encompassing arrangements that respectively enable and disable access to the target application.

The active environment is advantageously configured to provide both security and usability. In the present embodiment, it is assumed to provide at least a subset of the following features:

1. To lock the target application when the authorized user has no intention to use the target application.
2. To unlock the target application when the authorized user has the intention to use the target application and each of smart objects agree to grant the user access to the target application at that particular time.
3. Any smart object can deny access to any target application.
4. Access policies can vary over time.
5. Each smart object's access policies are independent of the other smart object's access policies.

An active environment providing these features can be implemented based on the smart objects providing to the verifier respective proofs of involvement, illustratively based on proximity to the user device or other types of provable involvement. The active environment in some embodiments exhibits at least a subset of the following additional features:

1. It should be simple to associate smart objects to users.
2. It should be simple to dissociate smart objects from users.
3. Associating a smart object to a user requires that user's awareness.
4. Dissociating a smart object from a user requires that user's awareness.
5. A user of an active environment understands what grants or prevents access to the target application (e.g., the presence or absence of enough activated smart objects and why smart objects become activated or fail to become activated).
6. Smart objects can be owned and managed by multiple parties (e.g., user and corporate employer).
7. A smart object may be associated with multiple users.
8. Smart objects may be partially trusted as long as trust relationships can be defined by the access control framework.

The particular features mentioned above are presented by way of example only, and different features can be provided in other embodiments.

An active environment in some embodiments could be configured to allow for the natural utilization of user-friendly interactions in order to ensure user intent. For example, a user may allow a mobile application to display content on an external screen, only if the user places his or her smartwatch in near-touch proximity of the screen, so that the screen and the watch exchange cryptographic material via near field communication (NFC).

It is assumed in the FIG. 1 embodiment that the credential manager 112 stores access keys for unlocking the target application 105 running on the user device 104. The learning agent 102 determines the particular set of smart objects 108 comprising the active environment of the user and activates these smart objects. The verifier 110 obtains proof of involvement from the smart objects and grants or denies access to the target application based on whether or not the expected proofs are received. In conjunction with identification of a particular set of smart objects, the learning agent 102 illustratively obtains cryptographic material from the credential manager and relays shares of this material to respective ones of the smart objects. The learning agent can relay encrypted shares that only the destination smart objects can decrypt. This separation provides the flexibility to have multiple credential managers, some that store credentials for personal use and others for business use.

At any given point in time a set of smart objects in an active environment may be capable of deriving multiple keys for various purposes. For example, these smart objects may allow for the derivation of an access key that unlocks the screen on a mobile telephone, as well as the derivation of another access key that allows the user to access a corporate email application on that mobile telephone. As noted above, the active environment is also utilized to control deauthentication, such as locking the target application when the user does not intend to use it. Therefore, for some applications, access keys may be valid only for a short period of time (e.g., a minute). The active environment can also support long-lived access keys, such as passwords for legacy applications.

The active environment of smart objects advantageously eliminates the inconvenience associated with having to carry predetermined sets of physical tokens. Instead, the target application is unlocked responsive to verification of proofs of involvement provided by the predicted set of smart objects. Also, because a specific active environment may enable access to a target application on a user device according to different policies, there is greater security than automatically enabling access when any k out of n smart objects are in proximity. The active environment also provides stronger security guarantees over authentication based on behavioral biometrics.

Although only single instances of system elements such as learning agent 102, user device 104, target application 105, verifier 110 and credential manager 112 are shown in FIG. 1, other embodiments can include multiple instances of one or more of these elements. For example, in some embodiments, there could be multiple learning agents with different purposes and different knowledge regarding the active environment of a user.

Also, in some embodiments, the functionality of different system elements can be combined into a single element. For example, it is possible in some embodiments to combine the functionality of the learning agent 102 and the credential manager 112 into a single system element. Similarly, the functionality of the learning agent 102 and the verifier 110 could be combined, as could the functionality of the verifier 110 and the credential manager 112. Numerous other combinations are possible.

The user device 104 in the present embodiment is implemented as a mobile telephone, although a wide variety of other types of user devices can be utilized. Such user devices in other embodiments need not be mobile devices. For example, in other embodiments, the user device could comprise an automobile or a smart television. The user device 104 is assumed to run the target application 105 for which access control is provided utilizing the learning agent 102, verifier 110 and credential manager 112 based at least in part on an active environment comprising the set of smart objects 108, as will be described in greater detail below.

As noted above, the set of smart objects 108 in this embodiment illustratively comprises a first subset of smart objects 108-1 that are managed or otherwise controlled by the user 106 and a second subset of smart objects 108-2 that are managed or otherwise controlled by a corporation. For example, personally-owned smart objects could be controlled by the user and corporate-owned smart objects could be controlled by the corporation. The corresponding portions of the active environment will participate in the unlocking of the target application on the user device 104 according to access control policies enforced in a distributed manner. In other embodiments, all of the smart objects 108 may be controlled by the user 106.

Moreover, the particular set of smart objects that is part of the active environment at a given point in time can be dynamically reconfigured in a manner that does not require explicit user actions.

A given one of the smart objects 108 can comprise, for example, a desktop computer, a laptop computer, a tablet computer, a mobile telephone, an automobile, a television, a set-top box, a wearable device, a smart watch, smart glasses or smart furniture. Other types of fixed, mobile or wearable processing devices or more generally any other objects that can be configured to include at least minimal processing, memory and communication functionality can be utilized as smart objects. Such objects are also considered examples of processing devices as that term is broadly used herein.

As indicated previously, a smart object in some embodiments can comprise an additional user device other than the user device 104 that runs the target application 105. Such an additional user device can also be associated with the authorized user 106. Other types of smart objects that are not necessarily also user devices associated with the authorized user 106 can be used. For example, in some embodiments, one or more of the smart objects 108 can include respective user devices associated with users other than the authorized user 106.

Accordingly, the user device 104 and smart objects 108 can illustratively comprise various combinations of processing devices capable of accessing the learning agent 102 and other system elements such as verifier 110. Numerous other operating scenarios involving a wide variety of different types and arrangements of processing devices are possible, as will be appreciated by those skilled in the art. For example, a given user device or smart object in some embodiments can illustratively comprise a virtual device, such as a virtual machine or a container. The learning agent 102, verifier 110 and credential manager 112 can similarly be implemented using any of a wide variety of different types of processing devices.

The elements 102, 104, 105, 108, 110 and 112 of information processing system 100 can be configured to communicate with one another over a variety of different networks. For example, such networks may include the Internet, a wide area network (WAN), a local area network (LAN), a satellite network, a telephone or cable network, a cellular network, a wireless network such as a Bluetooth, WiFi or WiMAX network, or various portions or combinations of these and other types of networks.

It is assumed in the FIG. 1 embodiment that at least a subset of the elements 102, 104, 105, 108, 110 and 112 are configured to establish secure communications with one another. Such secure communications can be established using any of a number of different pairing protocols or other secure communication techniques including, for example, Near Field Communications (NFC), Bluetooth and Secure Sockets Layer (SSL) protocols.

The above-noted prediction generated by the learning agent 102 is utilized in different ways in different embodiments. In some embodiments, the learning agent 102 requests cryptographic material from the credential manager 112 for activating the smart objects 108. Upon receipt of the requested cryptographic material from the credential manager 112, the learning agent 102 utilizes the cryptographic material to activate the smart objects. Each of the activated smart objects then provides the verifier 110 with a proof of involvement with the user device 104. The verifier controls user access to the target application based at least in part on the proofs provided by the activated smart objects. Examples of such embodiments will be described below in conjunction with FIGS. 3A, 4 and 6-8.

In other embodiments, the prediction generated by the learning agent 102 is provided to the verifier 110. The verifier 110 utilizes the prediction to obtain a proof of involvement with the user device 104 from each of the smart objects 108, and controls user access to the target application based at least in part on the obtained proofs. Examples of such embodiments will be described below in conjunction with FIGS. 3B and 5.

It is to be appreciated that the embodiments mentioned above are illustrative only, and other embodiments involving at least a subset of a learning agent, a user device, a set of smart objects, a verifier and a credential manager can be implemented, as will be apparent to those skilled in the art.

The "proof of involvement" in one or more of the illustrative embodiments may comprise, for example, proof of proximity between a given smart object 108 and the user device 104. However, proof of involvement as that term is broadly used herein is not limited to proof of proximity. Other types of proof of involvement that may be used include, for example, properties related to establishment of other types of direct links between a given smart object 108 and the user device 104, such as a virtual private network (VPN) link or a direct-sight link. A proof of involvement could also be derived from experiencing the environment in a closely related manner, for example, when two devices experience a similar motion signature (e.g., when the two devices are shaken simultaneously). Accordingly, the term "proof of involvement" as used herein is intended to be broadly construed, so as to encompass any type of information indicative of the involvement of a smart object with a user device and sufficient to support access management of the type disclosed herein.

Interaction between the verifier 110 and the smart objects 108 in some embodiments is carried out using a multiparty enforcing protocol. Such a protocol can be used to provide the above-noted proof of involvement from each of the smart objects 108 to the verifier 110. Accordingly, one or more of the smart objects can each provide its proof of involvement to the verifier at least in part in conjunction with the multiparty enforcing protocol carried out between the verifier and the smart objects. Moreover, the multiparty enforcing protocol can be utilized to derive an access key that unlocks the target application.

An example security model for the FIG. 1 embodiment is as follows. It is assumed that the credential manager 112 has knowledge of the access key for the target application on the user device 104. The credential manager 112 may also have a list of the smart objects 108 and their corresponding public keys, as well as the public key for the user device 104. For simplicity, we can assume that the verifier 110 gathers encrypted shares from smart objects and then combines them to reconstruct an access key. However, as we describe below, there are other ways to reconstruct access keys.

In some embodiments, the user device 104 and target application are trusted not to share the access keys with another device or application, and are trusted not to permanently store access keys.

In some embodiments, the learning agent 102 may be assumed to follow protocols for obtaining cryptographic material from the credential manager 112 and distributing shares of that cryptographic material to the smart objects 108. However, the learning agent is not trusted with the knowledge of any access keys. Because the shares are illustratively encrypted with the public key of smart objects, the learning agent cannot reconstruct keys. However, it should be clear that if shares were not encrypted, in principle, the learning agent could gain knowledge of the access keys.

In some embodiments, the learning agent 102 may also be trusted with keeping confidential all the information about the user that is collected for the purposes of learning which smart objects are best to activate at any given time. In particular, the learning agent will have knowledge of the list of smart objects that are associated with a user's active environment. In addition, the learning agent will have knowledge about actual device usage (e.g., when a user unlocks a phone or uses an email application) and corresponding user context (e.g., current location, WiFi connections, Bluetooth devices, etc.).

Similarly, the smart objects 108 in some embodiments may be trusted to follow the activation protocols and the multiparty enforcing protocols to derive access keys. They may also be trusted not to leak their shares to other smart objects or mobile devices.

The above-described security model and the particular features thereof are presented by way of example only, and other models can apply in other embodiments.

An example adversarial model for the FIG. 1 embodiment is as follows. It is assumed that the general goal of an adversary would be to gain access to the user device 104 or the target application. To do so, the adversary will attempt to gain physical possession of the device and possibly a set of smart objects in a user's active environment.

This example adversarial model does not consider adversaries that can tamper with user devices or smart objects, such as adversaries that can modify an operating system of the user device to gain unauthorized access to application data, or adversaries that can modify the firmware on smart objects.

It is assumed for purposes of this example adversarial model that communications are secured for authenticity, integrity, and confidentiality by means of encryption and cryptographic signatures, for example.

In some embodiments, adversaries' capabilities to manipulate the context may be assumed to be limited. It is assumed that adversaries can manipulate the context by moving user devices and smart objects to different locations and/or exposing them to different environmental conditions. However, it is assumed that adversaries cannot tamper with the clocks on mobile devices or smart objects.

This example adversarial model also does not address adversaries that gain knowledge of the access keys by compromising the credential manager 112. We may further assume that adversaries do not have access to the learning agent's knowledge about the user's active environment or context. Denial-of-service attacks (e.g., by jamming of communication channels) are also not included in this model.

The above-described adversarial model and the particular features thereof are presented by way of example only, and other models can apply in other embodiments.

An example of one possible implementation of the system 100 of FIG. 1 will now be described with reference to FIG. 2, which shows a transition diagram 200 illustrating transitions between various successful and unsuccessful activation scenarios 202 involving dynamically reconfigurable sets of smart objects in an active environment.

Figure 2:
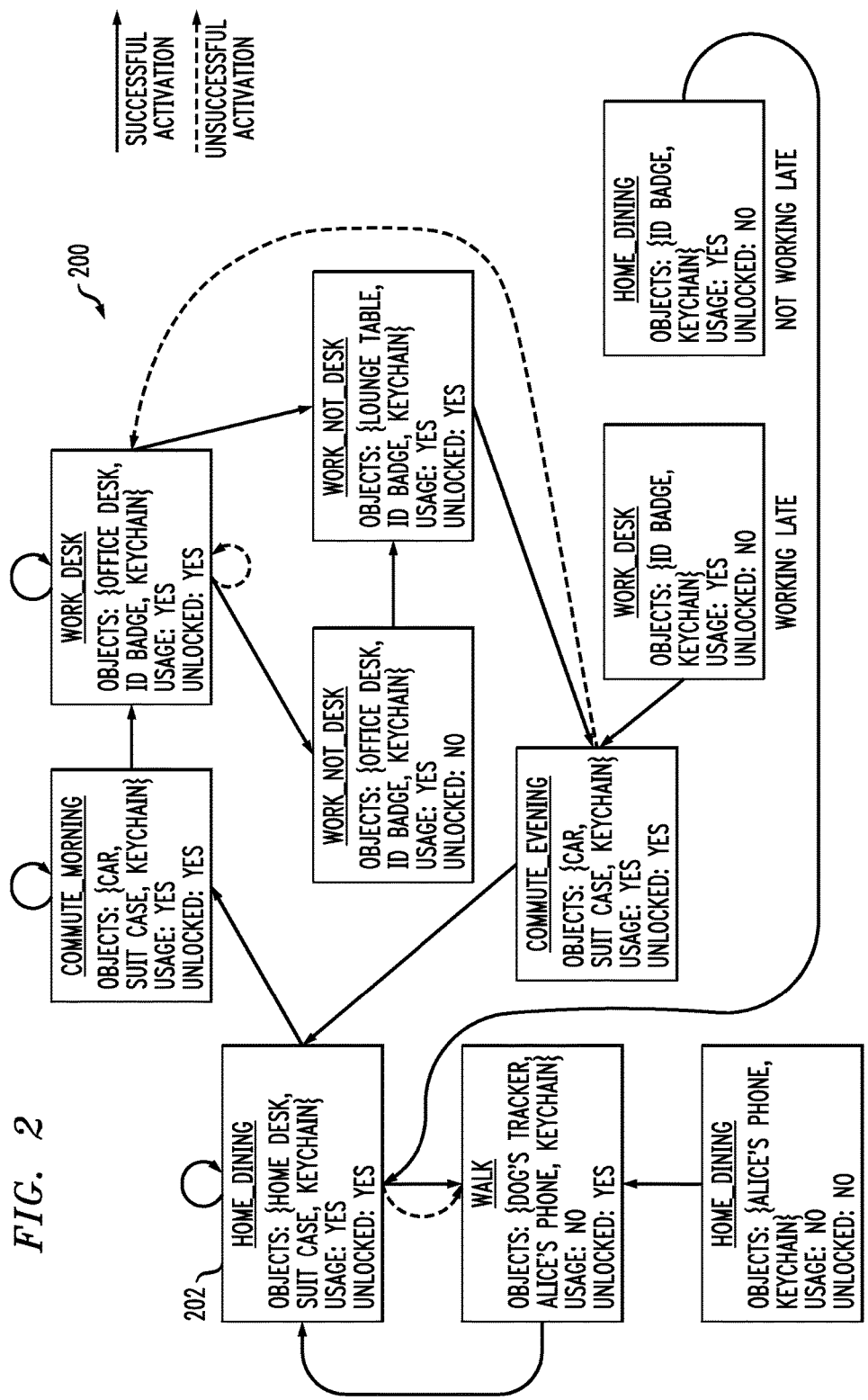
FIG. 2 shows examples of successful and unsuccessful activation scenarios in an active environment in one embodiment.

In the FIG. 2 embodiment, a user named "Bob" utilizes a personally-owned computing device (e.g., a mobile telephone) to access personal and corporate applications. Examples of personal applications include banking applications, social media applications, and mobile eHealth applications. Examples of corporate applications include business email, expense reporting, or project management applications. In such a scenario, Bob would like to retain control with regards to access to his personal applications. Bob's employer would also like to retain control when Bob accesses corporate applications at Bob's work place. Additionally, Bob's employer would like to ensure that Bob accesses corporate applications outside Bob's work place, only when Bob's mobile telephone is with high probability in Bob's possession. Thus, on the one hand, Bob's active environment outside Bob's work place can be indirectly leveraged to achieve access management of corporate applications. On the other hand, Bob's active environment in Bob's work place can also be indirectly leveraged to achieve access management of personal applications. In this case, it is important that access keys for corporate applications do not get revealed to personal applications and vice versa.

The set of smart objects in Bob's active environment could include the following personally owned devices: embedded Bluetooth devices in various personal objects including his desk at home, his suitcase, his car, and his physical keychain; Bob's dog's activity tracker; and the mobile telephone of Bob's wife ("Alice"). Bob's active environment could also include the following smart objects: embedded Bluetooth devices in various places at work, including his desk and his ID badge that has to be visibly worn.

In this case, Bob's active environment's learning agent could run on a third party cloud to which he and his corporation subscribe. Such a learning agent is configured to select which smart objects to activate throughout the day in order to maximize security and usability. In the process of activating a set of smart objects, the learning agent obtains cryptographic material from two credential managers, one that holds credentials for accessing corporate applications, and another one that holds credentials for accessing personal applications.

During a regular work day, Bob's active environment attempts to activate his desk at work as well as his keychain and his badge at times when Bob is typically at the office. The learning agent activates Bob's car, his suitcase, and his keychain during his commute. When Bob is at home, the learning agent activates his desk at home, his suitcase, and his keychain at times when the learning agent predicts that he is about to leave for work. The learning agent activates his dog's activity tracker but only if the dog is in motion. When Bob and Alice take their dog for a walk, Bob's keychain, Bob's dog's activity tracker, and Alice's mobile telephone are activated. Alice's mobile telephone is also activated, for example, when Alice and Bob are out running errands together. These and other successful and unsuccessful activation scenarios are illustrated by the example scenarios 202 of the transition diagram 200.

The particular smart objects utilized in the FIG. 2 embodiment and the associated activation scenarios should not be construed as limiting in any way.

As indicated previously, elements 102, 104, 105, 108, 110 and 112 can each be implemented using one or more processing devices. Each such processing device generally comprises at least one processor and an associated memory, and implements one or more functional modules for controlling certain features of the system 100.

The processor illustratively comprises a microprocessor, a microcontroller, an application-specific integrated circuit (ASIC), a field-programmable gate array (FPGA) or other type of processing circuitry, as well as portions or combinations of such circuitry elements.

The memory illustratively comprises random access memory (RAM), read-only memory (ROM) or other types of memory, in any combination. Such a memory and other memories disclosed herein may be viewed as examples of what are more generally referred to as "processor-readable storage media" storing executable computer program code or other types of software programs.

Articles of manufacture comprising such processor-readable storage media are considered embodiments of the present invention. A given such article of manufacture may comprise, for example, a storage device such as a storage disk, a storage array or an integrated circuit containing memory, or a wide variety of other types of computer program products. The term "article of manufacture" as used herein is intended to be broadly construed, but should be understood to exclude transitory, propagating signals.

A given such processing device further comprises a network interface configured to support communication between that device and one or more other processing devices over a network. The network interface of the processing device illustratively comprises one or more conventional transceivers.

At least portions of one or more of the elements 102, 104, 105, 108, 110 and 112 may be implemented at least in part in the form of software that is stored in a memory and executed by a processor. Such software is therefore stored and executed utilizing respective memory and processor elements of at least one processing device.

The above-noted network interface may also be used to support various types of communication utilizing additional or alternative channels for communication of information between system entities.

It is to be understood that the particular set of elements shown in FIG. 1 for providing access management based on an active environment of dynamically reconfigurable sets of smart objects is presented by way of illustrative example only, and in other embodiments additional or alternative elements may be used. Thus, another embodiment may include additional or alternative devices and other system entities, as well as different arrangements of device modules and other components.

The information processing system 100 as illustrated in FIG. 1 may include additional or alternative processing platforms, as well as numerous distinct processing platforms in any combination, with each such platform comprising one or more computers, storage devices or other types of processing devices. A given such processing platform comprises at least one processing device comprising a processor coupled to a memory, and the processing device may be implemented at least in part utilizing one or more virtual machines, containers or other cloud infrastructure.

In some embodiments, a given processing platform may comprise a plurality of virtual machines and one or more associated hypervisors. An example of a commercially available hypervisor platform that may be used to implement portions of the system 100 is the VMware® vSphere® which may have an associated virtual infrastructure management system such as the VMware® vCenter™. The underlying physical machines may comprise one or more distributed processing platforms that include storage products, such as VNX® and Symmetrix VMAX®, both commercially available from EMC Corporation of Hopkinton, Mass. A variety of other storage products and other processing platform components may be utilized to implement at least a portion of the system 100.

Cloud infrastructure utilized in a given embodiment can additionally or alternatively be implemented using other types of virtualization techniques, such as Docker containers or other types of containers.

Exemplary processes utilizing the learning agent 102, smart objects 108, verifier 110 and other elements of the system 100 will now be described in more detail with reference to the flow diagrams of FIGS. 3A and 3B. It is to be understood that these particular processes are exemplary only, and additional or alternative processes can be carried out in other embodiments.

Figure 3A:
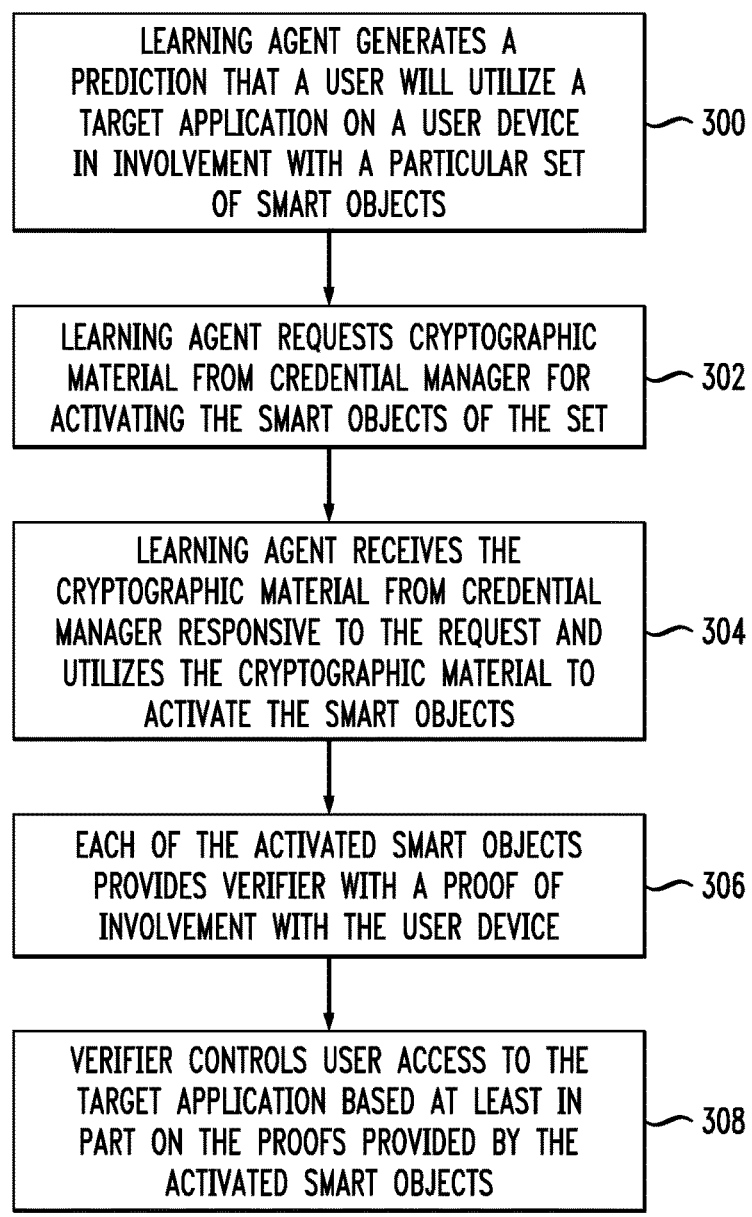
FIGS. 3A and 3B are flow diagrams of example processes in illustrative embodiments.

Referring initially to FIG. 3A, the exemplary process includes steps 300 through 308, which are assumed to be performed utilizing learning agent 102, user device 104, smart objects 108, verifier 110 and credential manager 112.

In step 300, the learning agent 102 generates a prediction that the user 106 will utilize the target application 105 on the user device 104 in involvement with a particular set of smart objects 108. The term "prediction" as referred to herein is intended to be broadly construed, and in some embodiments may be in the form of a list of smart object identifiers or other information suitably for identifying a particular set of smart objects.

As noted above, other types of determinations, not necessarily involving generation of a prediction, may be made in other embodiments. For example, the learning agent 102 can be configured to determine the particular set of smart objects responsive to an event such as the user requesting access to the target application 105.

The learning agent 102 in generating the prediction may be configured to maximize a utility function in which, for example, positive rewards are provided for permitting access to the target application in situations in which the user intended such access and negative rewards are provided for permitting access to the target application in situations in which the user did not intend such access. Such a utility function favors both security and usability.

Additional or alternative conditions may give rise to positive or negative rewards. For example, positive rewards can be provided when the authorized user finds his or her mobile telephone unlocked and wants to use it, when the mobile telephone remains locked when it is not used, or when the mobile telephone is used with a high implicit authentication score. The implicit authentication score in such an arrangement is based on the likelihood that the authorized user is currently using the device based on comparing features of the current use with features of previously observed use.

Negative rewards can be provided when the authorized user finds his or her mobile telephone locked and wants to use it, when the mobile telephone remains unnecessarily unlocked, or when the mobile telephone is used with a low implicit authentication score.

Additional details regarding utility functions involving positive and negative rewards will be described in more detail below. Other embodiments can utilize different types of utility functions in the learning agent 102, or can implement different types of learning functionality not based on a utility function.

In step 302, the learning agent 102 requests cryptographic material for activating the smart objects 108 of the set. This request is illustratively made directly to the credential manager 112, although other types of requests involving one or more other system entities could be made in other embodiments. Assuming that the cryptographic material is requested from the credential manager 112, the credential manager may also be assumed to have provided key information to the verifier 110 in a setup procedure conducted prior to or in conjunction with the request.

Moreover, the credential manager 112 may be configured so as to provide the cryptographic material to the learning agent 102 responsive to the request only if the request is first determined by the credential manager 112 to be consistent with one or more access control policies that it maintains for the target application.

In step 304, the learning agent 304 receives the cryptographic material responsive to the request, again illustratively from the credential manager 112, and utilizes the cryptographic material to activate the smart objects. Each of the smart objects may independently condition its activation on a determination that the activation is consistent with one or more access control policies that it maintains for the target application.

In step 306, each of the activated smart objects 108 provides the verifier 110 with a proof of involvement with the user device 104. The verifier 110 in some embodiments is implemented at least in part as a component of the user device, and in other embodiments is implemented at least in part as a component of the credential manager. Examples of the former arrangement can be seen in the embodiments of FIGS. 6 and 7, while an example of the latter type of arrangement can be seen in the embodiment of FIG. 8.

In step 308, the verifier 110 controls user access to the target application based at least in part on the proofs provided by the activated smart objects. The proofs provided by the activated smart objects 108 to the verifier 110 may be based at least in part on corresponding portions of the cryptographic material utilized to activate the smart objects. Also, one or more of the activated smart objects 108 may each provide its proof of involvement to the verifier at least in part via the target application. The verifier 110 illustratively controls user access to the target application based at least in part on the proofs provided by the activated smart objects 108 and a determination that the user access is consistent with one or more access control policies that it maintains for the target application.

The operations of steps 300 through 308 can be repeated for one or more additional iterations. For example, the steps can be repeated for different authentication sessions each involving different sets of smart objects determined to be associated with the active environment of a given user.

Figure 3B:
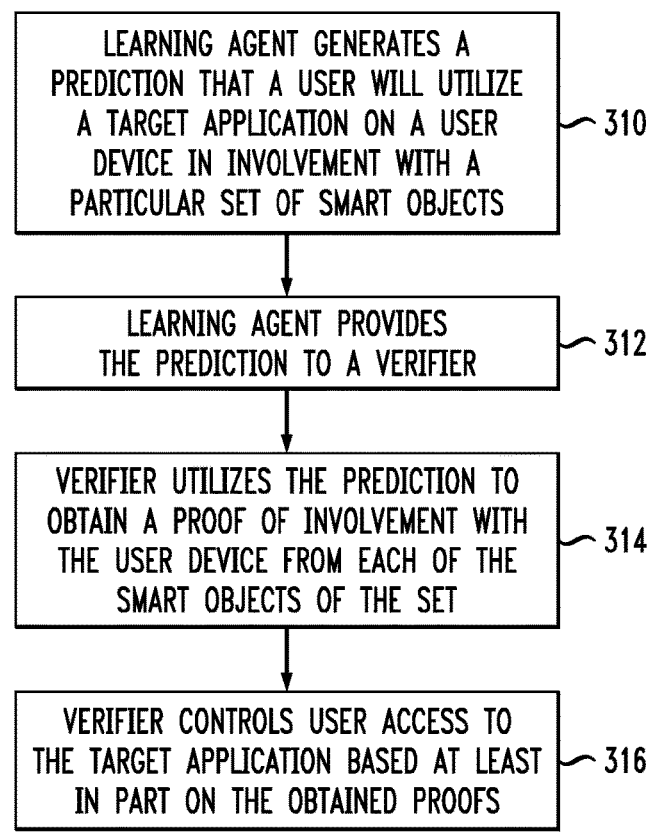

FIG. 3B shows another example of a process implemented in the system 100 of FIG. 1. The process in this embodiment comprises steps 310 through 316, which are again assumed to be performed utilizing learning agent 102, user device 104, smart objects 108, verifier 110 and credential manager 112.

In step 310, the learning agent 102 generates a prediction that the user 106 will utilize a target application 105 on the user device 104 in involvement with a particular set of smart objects 108. Again, in other embodiments, the learning agent 102 can determine that the user will utilize the target application on the user device 104 without specifically generating a prediction. For example, such a determination can be made responsive to various specified events that may occur within the system 100.

In step 312, the learning agent 102 provides the prediction to the verifier 110. As in the previous embodiment, it may be assumed that the learning agent has received cryptographic material from the credential manager 112, and that the credential manager 112 has also provided key information to the verifier 110 in a setup procedure.

In step 314, the verifier 110 utilizes the prediction to obtain a proof of involvement with the user device from each of the smart objects 108 of the set.

In step 316, the verifier 110 controls user access to the target application based at least in part on the obtained proofs.

Like the operations of the FIG. 3A process, the operations of steps 310 through 316 of the FIG. 3B process can be repeated for one or more additional iterations. For example, the steps can be repeated for different authentication sessions each involving different sets of smart objects determined to be associated with the active environment of a given user.

The particular processing operations and other system functionality described in conjunction with the flow diagrams of FIGS. 3A and 3B are presented by way of illustrative example only, and should not be construed as limiting the scope of embodiments of the invention in any way. Alternative embodiments can use other types of processing operations to implement access management based on an active environment comprising dynamically reconfigurable sets of smart objects. For example, the ordering of the process steps shown in the figures may be varied in other embodiments, or certain steps may be performed concurrently with one another rather than serially.

Additional illustrative embodiments will now be described with reference to FIGS. 4 through 8. In each of these embodiments, access management is provided utilizing active environments comprising dynamically reconfigurable sets of smart objects. Each of these embodiments includes a learning agent, a user device, a target application, smart objects, a verifier and a credential manager which are generally configured in a manner similar to the corresponding elements of the FIG. 1 embodiment. In addition, in each of FIGS. 4 through 8, interactions between the system elements are labeled in the figure with numbers that correspond to the steps of an example access management process implemented in that system.

Figure 4:
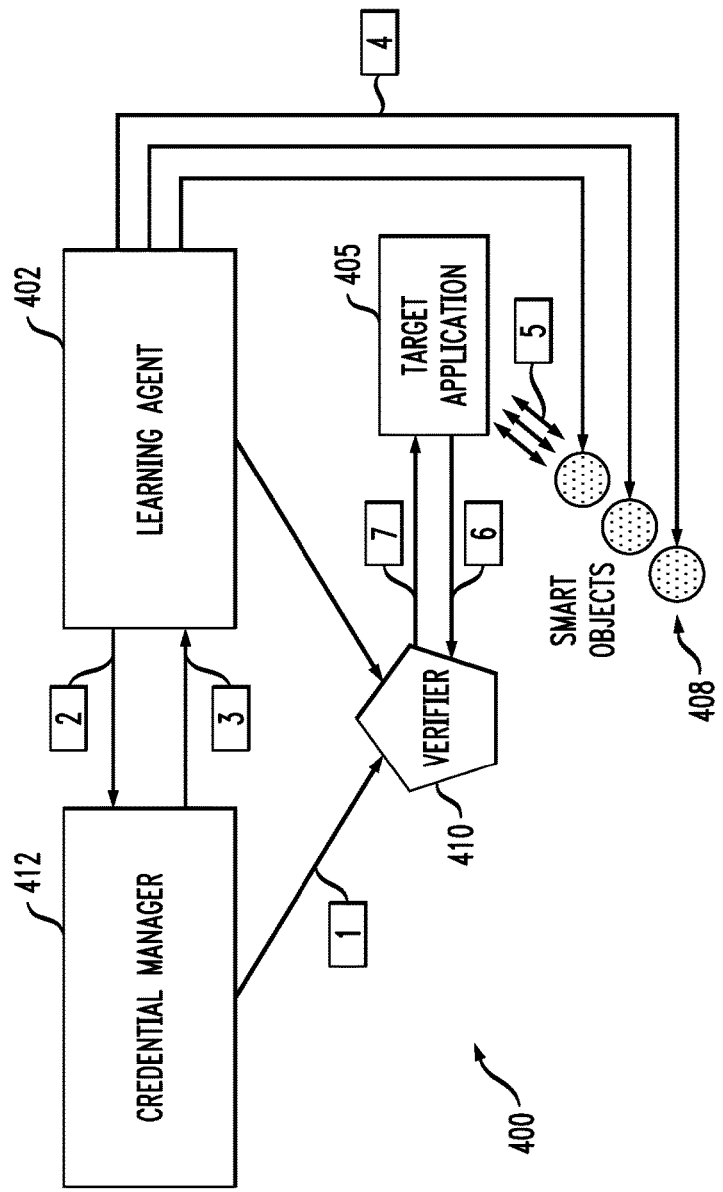
FIGS. 4 and 5 show example operating configurations of active environments in illustrative embodiments.

Referring now to FIG. 4, an information processing system 400 comprises learning agent 402, target application 405, smart objects 408, verifier 410 and credential manager 412. The user device running the target application 405 is not explicitly shown.

One possible process for providing user access to the target application 405 in this embodiment is as follows:

1. The credential manager 412 provides key information to the verifier 410 in a setup process prior to user interaction.

2. The learning agent 402 predicts that the user will use the target application 405 in the proximity of a particular set of smart objects 408. Therefore, it requests cryptographic material from the credential manager 412 to activate these particular smart objects 408.

3. If the request is consistent with access control policies, the credential manager 412 provides these cryptographic materials to the learning agent 402, such that shares of the cryptographic materials can be distributed securely to the corresponding smart objects 408.

4. The learning agent 402 attempts to activate the set of smart objects 408 by distributing the corresponding cryptographic shares provided by the credential manager. The smart objects 408 accept the activation request only when such a request is consistent with access control policies known by each of the smart objects 408.

5. The activated smart objects use their respective shares of the cryptographic material to prove that the user device running the target application 405 is in proximity of the smart objects.

6. The target application 405 relays these proofs to the verifier 410.

7. The verifier 410 uses these proofs to determine whether to provide access to the target application 405.

Figure 5:
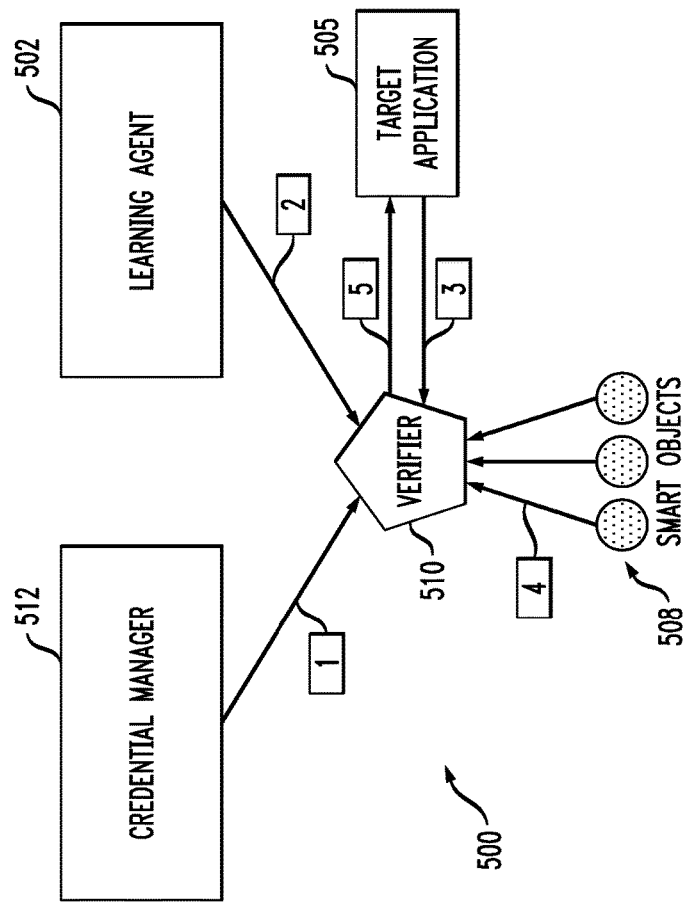

FIG. 5 shows another information processing system 500. The system 500 comprises learning agent 502, target application 505, smart objects 508, verifier 510 and credential manager 512. As in the FIG. 4 embodiment, the user device running the target application 505 is not explicitly shown.

One possible process for providing user access to the target application 505 in this embodiment is as follows:

1. The credential manager 512 provides key information to the verifier 510 in a setup process prior to user interaction.

2. The learning agent 502 predicts that the user will use the target application 505 in the proximity of a particular set of smart objects 508. Therefore, it passes this prediction to the verifier 510.

3. If the user attempts to use the target application 505, the target application 505 tries to obtain the access key from the verifier 510.

4. If the request for the access key is consistent with access control policies known to the verifier 510, the verifier 510 obtains proof of proximity from the smart objects 508 predicted to be in proximity to the user device running the target application.

5. The verifier 510 uses these proofs to determine whether to provide access to the target application 505.

The embodiments of FIGS. 4 and 5 correspond generally to example implementations of the processes of respective FIGS. 3A and 3B. However, the particular interactions and other processing operations described in conjunction with FIGS. 4 and 5 are presented by way of example only, and alternative interactions and other processing operations can be used in other embodiments.

Additional details relating to illustrative embodiments of the invention will now be described with reference to FIGS. 6 through 8. As indicated previously, these figures show different possible arrangements of learning agents, user devices, target applications, smart objects, verifiers and credential managers in illustrative embodiments. These embodiments all utilize processes similar to that of FIG. 3A, but alternative versions could be configured in a straightforward manner to utilize processes similar to that of FIG. 3B.

Figure 6:
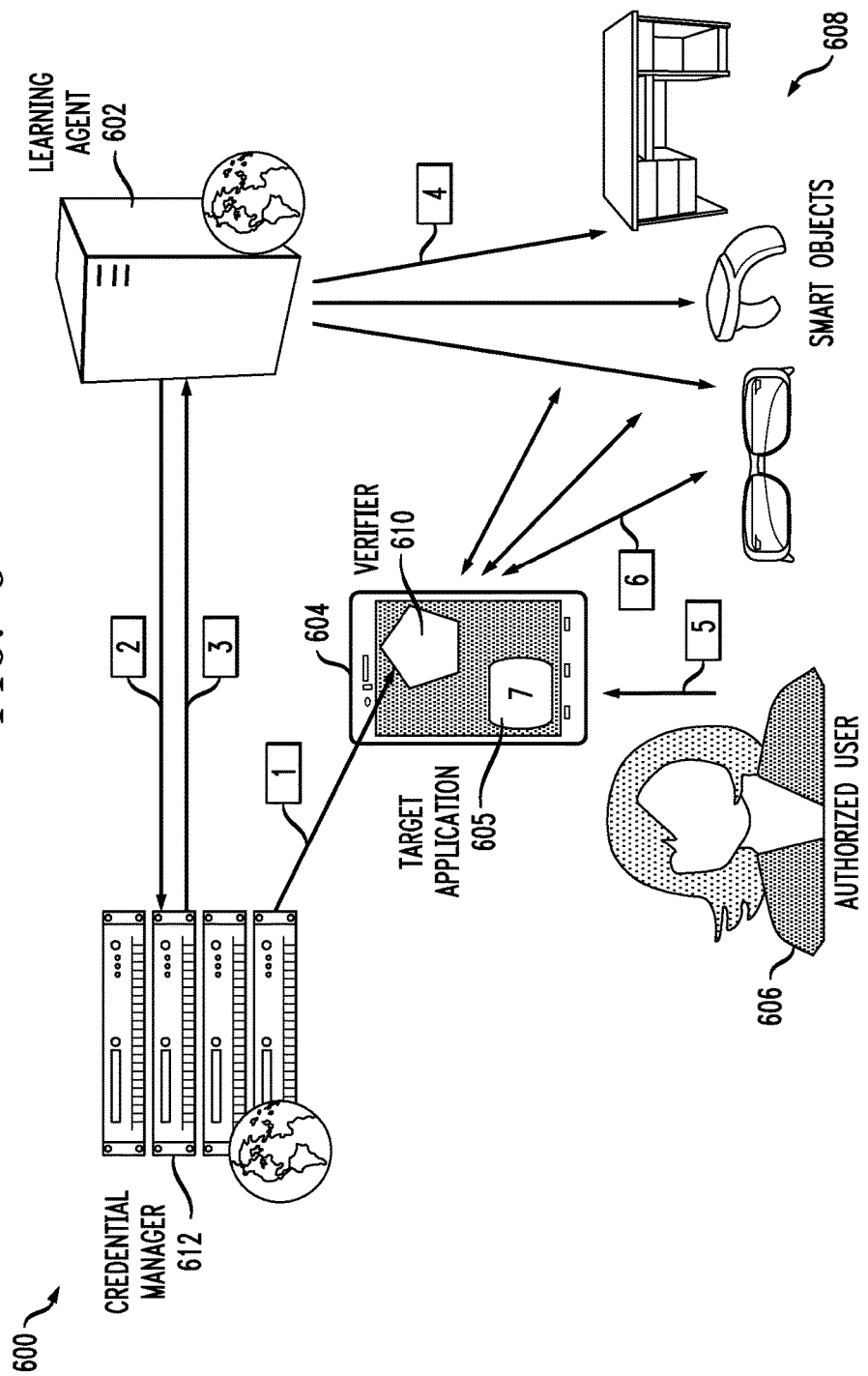
FIGS. 6, 7 and 8 show respective illustrative embodiments that are configured to utilize an operating configuration of the type shown in FIG. 4.

FIG. 6 shows an information processing system 600 comprising a learning agent 602, a user device 604, a target application 605 running on the user device 604, an authorized user 606, smart objects 608, a verifier 610 and a credential manager 612.

The learning agent 602 and the credential manager 612 are implemented as respective cloud applications running on cloud servers accessible over a network such as the Internet. The user device 604 comprises a mobile telephone and the smart objects 608 comprise a pair of smart glasses, a smart watch and a piece of smart furniture (e.g., a desk at work). The verifier 610 in this embodiment is implemented in the form of software running on the user device 604 that also runs the target application 605.

Also shown in FIG. 6 are interactions between the various elements of system 600, in accordance with an example process. These interactions and other processing operations are labeled in the figure with numbers that correspond to the steps of the example process as given below:

1. The credential manager 612 transfers key information to the verifier 610. This can be done, for example, during the installation of the verifier 610 on the user device 604.

2. The learning agent 602 predicts that the authorized user 606 will use the target application 605 while near the desk, smart glasses, and smart watch. Thus, the learning agent 602 requests cryptographic material from the credential manager 612 to activate these smart objects 608.

3. If the activation of such objects is consistent with the access control policies of the credential manager 612, the credential manager 612 sends the cryptographic material to the learning agent 602 to enable the activation of the specified smart objects 608.

4. The learning agent 602 attempts to activate the smart objects 608 with the cryptographic material provided by the credential manager 612. These smart objects will allow activation only when such activation is consistent with access control policies known by each smart object independently.

5. As predicted by the learning agent 602, the user attempts to use the target application 605.

6. The verifier 610 and the smart objects 608 engage in a multiparty enforcing protocol. During the protocol, the smart objects 608 provide the verifier 610 with respective proofs of proximity to the user device 604. In addition to verifying the proofs of proximity of the smart objects 608, the verifier also checks that this particular set of smart objects should grant access to the target application 605.

7. If the access control policies of the verifier 610 are in agreement, the verifier 610 grants access to the target application 605. Otherwise it denies access, displaying a reason to the user and optionally prompting for step authentication.

It is to be appreciated that the foregoing steps are presented by way of illustrative example only, and additional or alternative steps, as well as different arrangements of system elements, can be used in other embodiments.

Figure 7:
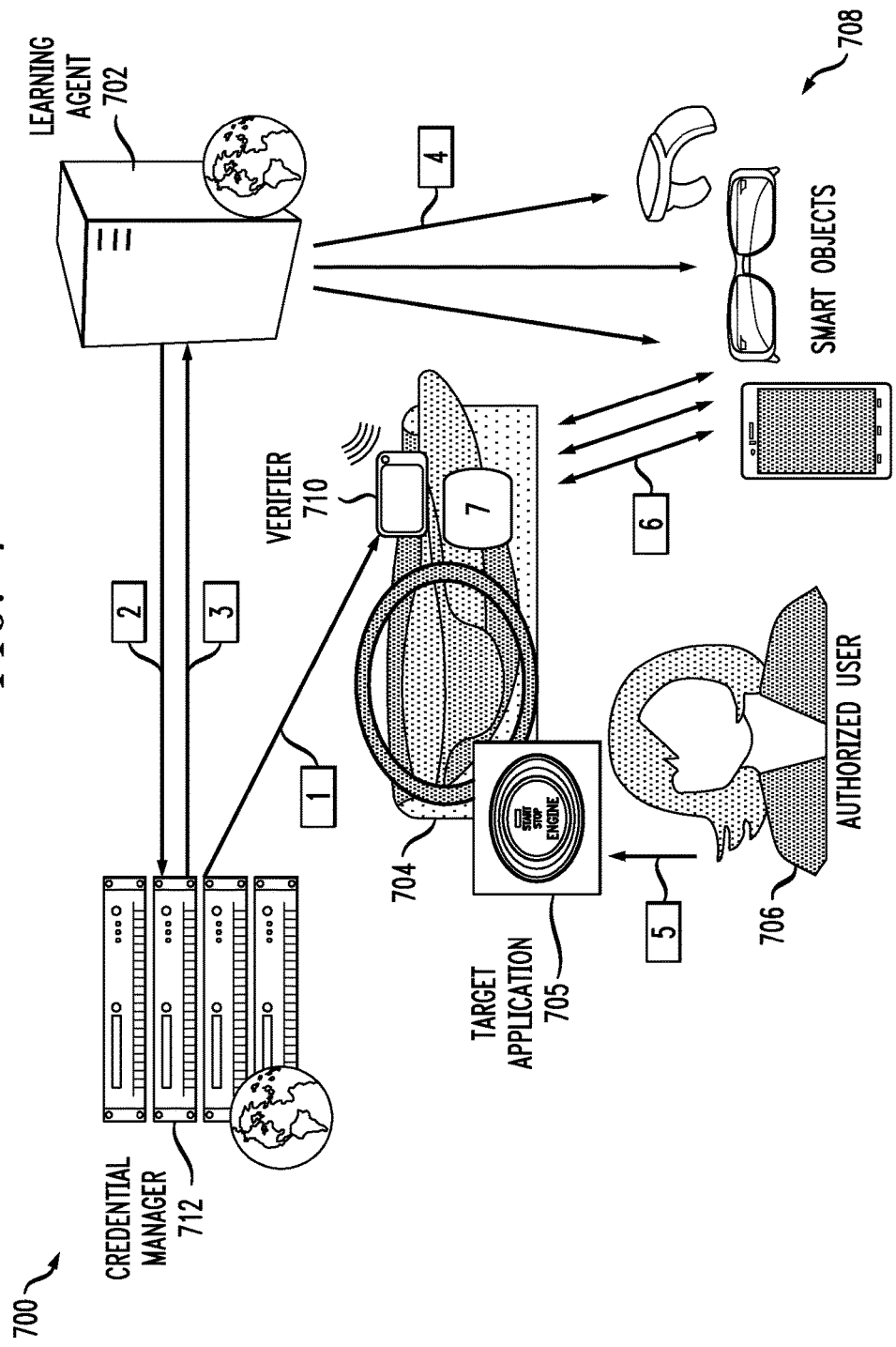

FIG. 7 shows another illustrative embodiment with one such different arrangement of system elements. In this embodiment, an information processing system 700 comprises a learning agent 702, a user device 704, a target application 705 running on the user device 704, an authorized user 706, smart objects 708, a verifier 710 and a credential manager 712.

The learning agent 702 and the credential manager 712 are again implemented as respective cloud applications running on cloud servers accessible over a network such as the Internet. The user device 704 comprises an automobile and the smart objects 708 comprise a mobile telephone, a pair of smart glasses and a smart watch. The verifier 710 in this embodiment is implemented in the form of software running on the user device 704 that also runs the target application 705. For example, the verifier 710 can illustratively comprise a component of the automobile computer system. The target application 705 is an application that controls the starting of the engine responsive to user actuation of an ignition button.

Accordingly, the automobile has an ignition button that when pressed by the user 706 initiates the starting of the engine. The engine does not actually start, however, unless the verifier 710 confirms the involvement of the smart objects 708 in accordance with the prediction generated by the learning agent 702. The active environment in this embodiment can therefore be used, for example, to prevent the automobile engine from being started if the user is currently utilizing certain operating modes of the mobile telephone, such as texting or in-hand calling modes, and to permit the automobile engine to be started if the user is currently utilizing other operating modes, such as directional navigation or hands-free calling modes.

Also shown in FIG. 7 are interactions between the various elements of system 700, in accordance with an example process. These interactions and other processing operations are labeled in the figure with numbers that correspond to the steps of the example process as given below:

1. The credential manager 712 transfers key information to the verifier 710. This can be done, for example, during the installation of the verifier 710 into the automobile or during manufacture.

2. The learning agent 702 predicts that the authorized user 706 will use the target application 705 while near the mobile telephone, smart glasses, and smart watch. Thus, the learning agent 702 requests cryptographic material from the credential manager 712 to activate these smart objects 708.

3. If the activation of such objects is consistent with the access control policies of the credential manager 712, the credential manager 712 sends the cryptographic material to the learning agent 702 to enable the activation of the specified smart objects 708.

4. The learning agent 702 attempts to activate the smart objects 708 with the cryptographic material provided by the credential manager 712. These smart objects will allow activation only when such activation is consistent with access control policies known by each smart object independently.

5. As predicted by the learning agent 702, the user 706 attempts to use the target application 705 by attempting to start the automobile.

6. The verifier 710 and the smart objects 708 engage in a multiparty enforcing protocol. During the protocol, the smart objects provide the verifier with respective proofs of proximity to the user device 704. In addition to verifying the proofs of proximity of the smart objects 708, the verifier 710 also checks that this particular set of smart objects should grant access to the target application 705.

7. If the access control policies of the verifier 710 are in agreement, the verifier 710 grants access to the target application 705. Otherwise it denies access, displaying a reason to the user and optionally prompting for step authentication.

Again, the foregoing steps are presented by way of illustrative example only, and additional or alternative steps, as well as different arrangements of system elements, can be used in other embodiments.

Figure 8:
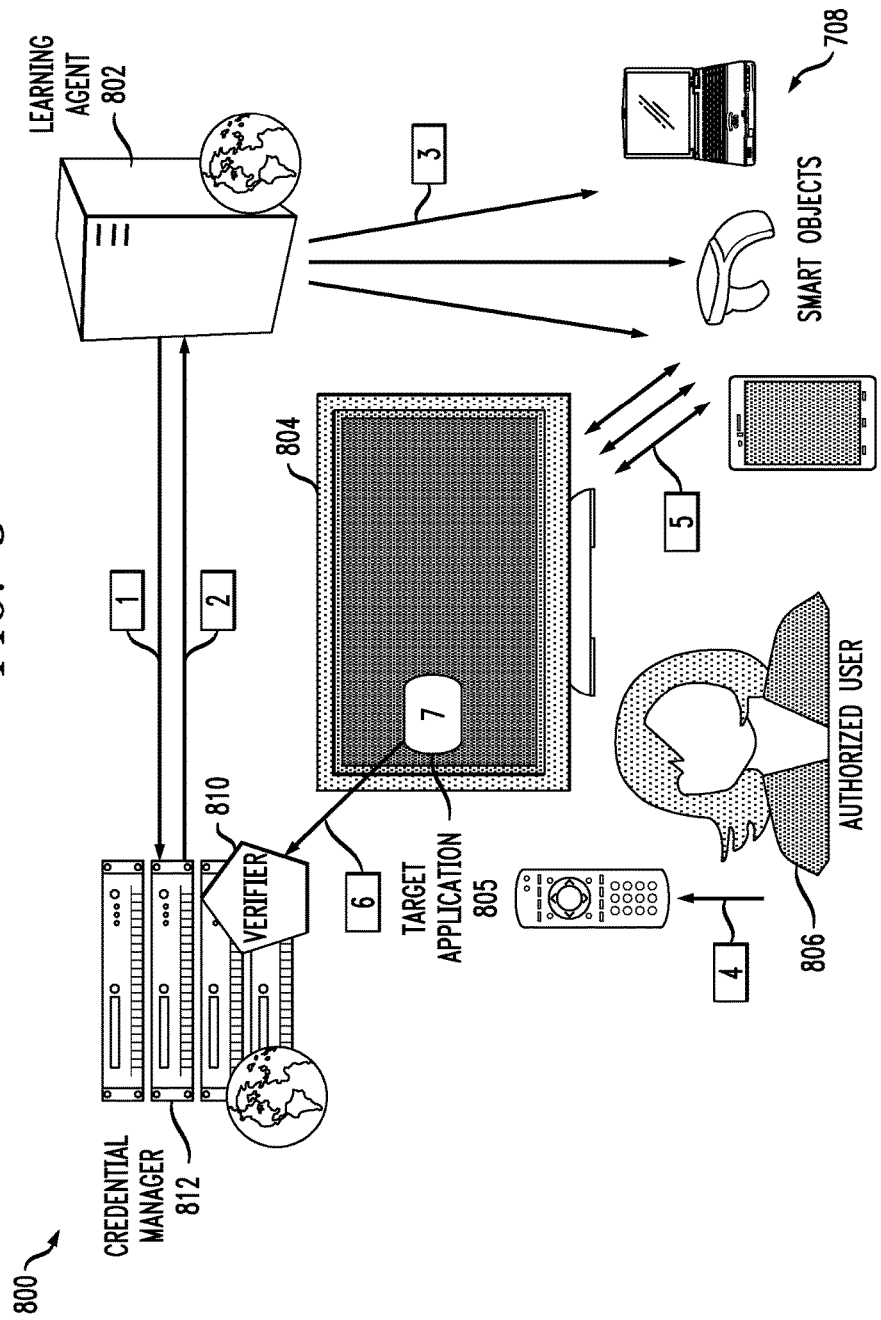

FIG. 8 shows yet another illustrative embodiment with a different arrangement of system elements. In this embodiment, an information processing system 800 comprises a learning agent 802, a user device 804, a target application 805 running on the user device 804, an authorized user 806, smart objects 808, a verifier 810 and a credential manager 812.

The learning agent 802 and the credential manager 812 are once again implemented as respective cloud applications running on cloud servers accessible over a network such as the Internet. The user device 804 in this embodiment comprises a smart television and the target application 805 comprises a premium content portal accessible via the smart television. The smart objects 808 comprise a mobile telephone, a pair of smart glasses and a laptop computer. The verifier 810 is implemented in the form of software running as a component of the credential manager 812.

Like FIGS. 6 and 7, FIG. 8 also shows interactions between the various elements of system 800, in accordance with an example process. These interactions and other processing operations are labeled in the figure with numbers that correspond to the steps of the example process as given below:

1. The learning agent 802 predicts that the authorized user 806 will use the target application 805 while near the mobile telephone, laptop, and smart watch. Thus, the learning agent 802 requests cryptographic material from the credential manager 812 to activate these smart objects 808.

2. If the activation of such objects is consistent with the access control policies of the credential manager 812, the credential manager 812 sends the cryptographic material to the learning agent 802 to enable the activation of the specified smart objects 808.

3. The learning agent 802 attempts to activate the smart objects 808 with the cryptographic material provided by the credential manager 812. These smart objects will allow activation only when such activation is consistent with access control policies known by each smart object independently.

4. As predicted by the learning agent 802, the user 806 attempts to watch premium content on the smart television, which may be a television never seen before by the user 806 (e.g., a television in a hotel room).

5. The verifier 810 and the smart objects 808 engage in a multiparty enforcing protocol. During the protocol, the smart objects 808 provide the verifier with respective proofs of proximity to the user device 804. In addition to verifying the proofs of proximity of the smart objects 808, the verifier also checks that this particular set of smart objects should grant access to the target application 805.

6. If the access control policies of the verifier 810 are in agreement, the verifier 810 grants access to the target application 805. Otherwise it denies access, displaying a reason to the user and optionally prompting for step authentication.

As mentioned previously, these particular steps are presented by way of illustrative example only, and additional or alternative steps, as well as different arrangements of system elements, can be used in other embodiments.

The user devices, smart objects and possibly other system elements in the embodiments of FIGS. 4-8 will each generally include at least one transceiver, such as a Bluetooth or NFC transceiver, suitable for communicating with one or more other system elements. These transceivers are illustrative examples of the network interface previously referred to in the context of the FIG. 1 embodiment. Also, various pairing protocols can be carried out between the system elements in order to establish secure communications.

Additional details regarding access management based on an active environment comprising dynamically reconfigurable sets of smart objects in illustrative embodiments will now be described.

First, an example of a learning agent that may be used in illustrative embodiments will be described in more detail.

The learning agent of an active environment in this particular example is illustratively configured to maximize an expected reward subject to a Markovian transition model. More particularly, for a model with a set of states S and a set of actions A that can be taken in those states, the leaning agent aims to find a strategy $\pi$ with maximum utility $U^\pi$. A strategy $\pi$ is a function that determines the action $\pi(s)$ to take at a given state s. The utility $U^\pi$ can be thought of as an expected sum of discounted rewards for a Markov decision process (MDP) defined by a transition model T(s, a, s') with s, s'$\in$S and a$\in$A, a reward function R(s, a, s'), and an initial state $S_0$. The transition model T(s, a, s') is defined as the probability P(s'|s, a) that the learning agent lands in state s' when performing the action a from the state s. The reward function R(s, a, s') is a real-valued function that represents the value associated to landing in state s' when the learning agent takes action a from state s.

It is assumed that the transition model T(s, a, s') and the reward function R(s, a, s') in this embodiment are not known to the learning agent. When they are known, the problem of finding the optimal strategy $\pi$ can be solved via inductive learning (e.g., planning) However, in the present embodiment, it is assumed that the learning agent progressively learns the transition model and the reward function. The learning agent learns a better strategy $\pi$ as the number of states that it visits increases.

For simplicity, we assume that the learning agent is an application that runs on a cloud, but it can also run on a user device such as a mobile telephone. As will be described in more detail below, the learning agent in other embodiments can be implemented by a distributed system with components on a mobile telephone and a smartwatch, for example.

The learning agent may have the capability to communicate with each smart object in a user's active environment. Thus, in some embodiments, we may assume that the learning agent communicates with smart objects directly (e.g., via IPv6). However, the communication can be indirect via activator devices such as a user device (e.g., via Bluetooth through the user's mobile telephone). Smart objects (or their activator devices) are capable of determining whether activating a specific smart object in a specific context is consistent with access control policies. The learning agent does not need to know these access control policies, a priori. Also note that the learning agent may fail to communicate to a smart object (or its activator) occasionally.

We now give an overview of example states and actions in some embodiments of active environments. We describe below how the learning agent observes the rewards associated to states. In the following description, we refer to a set of smart objects as "activated" after the learning agent has first proposed their activation by selecting them for unlocking the device or application, retrieving the corresponding cryptographic material from a credential manager and distributing shares of the cryptographic material to the smart objects, and the smart objects have accepted such proposed activation in accordance with applicable access control policies. Other processes for activation of smart objects can be used in other embodiments. The activated smart objects and possible other system elements such as the learning agent and the verifier illustratively comprise the active environment of the user Also, we describe how the learning agent uses reinforcement learning to determine the best activation strategy. In particular, we describe how the learning agent gets positive rewards when the user wants to use his or her device and it transparently unlocks, and when the user does not want to use it and it transparently locks. We also describe how the learning agent obtains negative rewards when the user wants to use his or her device but it does not unlock (thus losing usability), and when the user does not want to use his or her device but it remains unlocked (thus losing security). There is an additional form of negative reward (i.e., a discounted reward) that is also used in this example model.

The set of states in a given embodiment may include at least a subset of the following:

S1—a possibly empty set of activated smart objects;

S2—a boolean value that represents whether or not these activated smart objects can unlock the device in question;

S3—a user intent or lack of intent to unlock the device in question;

S4—a secret sharing scheme, which would be used to derive the access key from the shares in the activated smart objects; and S5—a set of context features extracted from a collection of data streams (e.g., location, WiFi, Bluetooth, etc.) with contextual information, to be leveraged by the learning agent to determine an optimal strategy to select actions; and S6—a result of a step-authentication performed after the active environment fails to produce the access key, where the result illustratively indicates whether the user successfully step-authenticated and the number of attempts, which can be leveraged by the learning agent to earn a reward.

While the learning agent in this embodiment does not know the reward function, the learning agent needs to know the reward associated to the current state. We will describe below how the reward (positive or negative) is observed by the learning agent.

In the present embodiment, transitioning between states is not strictly controlled by the learning agent because a state depends on the user action, the context, and whether or not the activated objects can derive the access key. However, the learning agent can, at least in part, control the set of objects that are activated, and the sharing scheme that should be used to reconstruct the access key. Therefore, actions in this example model correspond to attempts to activate a set of objects every interval of time or "epoch." However, transition models in MDPs are probabilistic. That is, performing an action does not guarantee the landing on a specific state. Thus, by performing the "action" of activating a set of objects, the learning agent will attempt to move to a state in which some of the parts are unknown until the learning agent enters that state. Furthermore, the learning agent may not always succeed in activating the objects that it intends (e.g., because an object goes out of reach of the learning agent). This non-determinism is accounted for in the example model as well. While the set of available actions will depend on the state, it is important to note that the learning agent will be able to determine a finite set of possible configurations. Some configurations may end up being illegal (according to the access control policies), and the smart objects will reject the enabling command. However, because actions are probabilistic, this is also accounted for in the model.

Note that while the learning agent can always attempt the activation of a smart object, in the example model we do not assume that all the smart objects are under the control of the learning agent. As mentioned previously, smart objects may be owned and managed by multiple entities. In particular, some requests to activate specific smart objects will fail according to policies that are specified in a decentralized manner. We describe below a number of alternative ways to implement the learning agent.

Because a learning agent in the present embodiment moves from one state to another every fixed period of time (e.g., every minute), user intent to unlock a device may happen at any point during this period of time or epoch, and therefore, the learning agent will only be able to fully observe the state at the end of the epoch. A user's active environment may manage multiple access keys, and thus epoch sizes may differ for different access keys. For example, unlocking a mobile telephone may require an epoch of 10 minutes, while a critical application (e.g., email) may require one minute epochs.

An active environment in the present embodiment illustratively utilizes a framework for specifying conditions under which individual smart objects can be activated. In other words, smart objects enforce writing access (e.g., of their respective shares of the cryptographic material to their respective local memories). Smart objects may not necessarily need to enforce reading access. In this case, anyone could read the share of cryptographic material stored in a smart object. For example, the access control framework would allow for the specification that a user's smart desk be activated only during normal working hours (e.g., Monday through Friday from 9:00 AM to 5:00 PM). In a scenario in which all the smart objects for a user's active environment are managed by a single entity, all the policies could be stored in a centralized manner, and, when the learning agent tries to activate a smart object, the smart object would query the policy database to determine whether its activation is consistent with the policies for the specified user. Another scenario is one in which the smart objects in a user's active environment are managed by multiple entities. For example, some smart objects may be managed by a corporation or other entity that employs the user. Other smart objects may be personal property of the user and, therefore, managed by the user himself, or he may delegate their management to a third party, or in fact, multiple parties that could comprise cloud backends provided by the manufacturers of the smart objects. Therefore, the access control framework for active environments can be decentralized.

We note that the learning agent does not need to be aware of the policies. The access control policies partially define the transition model T(s, a, s'), which the learning agent is assumed not to know. This approach is flexible because it allows the learning agent to operate even when the policies may be dynamically changing and their storage partially resides in multiple locations.

We describe in more detail below how to implement a distributed access control framework for active environments by storing policies in a decentralized manner and querying them using a logic-based access control language.

As mentioned previously, some embodiments utilize a multiparty enforcing protocol in configuring an active environment. For example, an active environment providing access management for general purpose computing devices, such as mobile telephones and laptops, is illustratively configured without assuming that these are trusted to protect access keys. Therefore, a multiparty enforcing protocol is utilized to prevent granting of access to a device or application when the corresponding active environment does not allow it. More particularly, the active environment reveals the access key through a secure multiparty computation with input from multiple smart objects.

Without the access key, the user will not be able to use the device or application. One possible way of implementing the multiparty enforcing protocol is through a variation of a secret-sharing scheme, in which the access key is revealed only if enough shares of a key are combined, i.e., only if a sufficient number of activated smart objects participate in the computation. Another way to implement the multiparty enforcing protocol is through the use of digitally-signed access control statements that activated smart objects send to the user device running the target application. These signed statements are then relayed to the verifier that uses them to evaluate whether to reveal the corresponding access key. The verifier uses these statements as evidential facts together with other known policies. Such access key shares and digitally-signed access control statements are considered examples of what are more generally referred to herein as "proofs of involvement" that are provided by respective smart objects to the verifier.

In some embodiments, as mentioned above, the proofs of involvement illustratively comprise proofs of proximity of the smart objects to the user device running the target application. Arrangements of this type can face a number of threats and adversaries, as will now be described in more detail.

In the following description, we assume the existence of a data-link layer or physical layer networking protocol that can be utilized by the user device hosting the target application and each of the smart objects, after which both the user device and a given one of the smart objects can safely assume that both are connected using the same physical link. We call this protocol a "proof-of-immediate-proximity" protocol. This protocol in the present embodiment utilizes the following definitions:

1. For a fixed time epoch e, a smart object is 1-hop from a target application A={application, device, user} if the device in the triple A and the smart object mutually provide proof-of-immediate-proximity for the epoch e.

2. For a fixed time epoch e, a set of smart objects is active-environment-proximal or simply ae-proximal to a target application A at epoch e if each smart object in the set is 1-hop from A at epoch e. We can have alternate definitions of ae-proximity if we are willing to trust smart objects to provide proof of n-hop proximity.

With these example features, a target application A obtains the access key for epoch e from a verifier V if A proves to V that there is a set of smart objects that is ae-proximal to A, such that the set is an active A-legal set for A during e, where a set of smart objects is A-legal for A={application, device, user} at epoch e if there is a set of access control policies P that allow the user in A to access the {application, device} pair in A at epoch e.

In some embodiments, we may model adversaries according to their capabilities for (i) acquiring knowledge about the usage behavior of the authorized user; (ii) becoming ae-proximal to subsets of smart objects associated to the authorized user's active environment; and (iii) manipulating the context that the active environment's learning agent uses to decide on a strategy for activating smart objects.

The following are some attacker examples described by their capabilities:

1. A behavior-expert attacker is an attacker who has perfect knowledge of the user's behavior.

2. A behavior-ignorant attacker is an attacker who does not have knowledge of the user's behavior.

3. A limited-environment-reach attacker is an attacker who does not have the capability to be ae-proximal to an arbitrary set of smart objects.

4. An arbitrary-environment-reach attacker is an attacker who can be ae-proximal to an arbitrary set of smart objects.

5. A no-context-manipulation attacker is an attacker who cannot manipulate the context features that active environment's agent uses to decide on smart object activation strategies.

The following are general security goals of an active environment described in terms of limiting the unlocking of a target application:

1. Limited-reach: The probability that an attacker, who gets temporary access to the target device or application, is able to unlock it by controlling the reach to a limited set of smart objects is small most of the time.

2. Limited-context: The probability that an attacker, who gets temporary access to the target device or application, is able to unlock it by manipulating the context is small most of the time.

3. Limited-use: The probability that an attacker, who gets temporary access to the target device or application, is able to unlock it by leveraging knowledge about the user's behavior is small most of the time.

4. The security of the active environment relies in part on the following security-related sub-goal that can be briefly described as proof of active environment proximity, or proof of ae-proximity for short: The probability that an attacker is able to unlock a target application A={application, device, user} during epoch e when A is not ae-proximal to an active A-legal set of smart objects at epoch e is small.

As described previously, an active environment in some embodiments comprises a reinforcement learning agent that learns to select the best subset of smart objects in order to maximize expected utility. The utility function may be defined in terms of rewards that favor obtaining an access key for unlocking a device or application only when the user intends to do so. The utility function penalizes the learning agent (via negative rewards) when the user does not intend to use the device but access keys become available to the target application, and when the access keys do not become available even though the user intends to use the target application. The learning agent operates in conjunction with an access control framework which is utilized to set and enforce access control policies. In addition, the above-noted multiparty enforcing protocol ensures that access keys are computed only when the learning agent activates a set of smart objects and the corresponding activations succeeded because the activations were consistent with existing access control policies.

Additional details regarding illustrative embodiments of the learning agent of an active environment will now be described. As mentioned previously, the learning agent in some embodiments is configured to determine the best action to take at any given state to maximize expected utility. In other words, the learning agent uses an algorithm to compute the optimal strategy π. More particularly, an optimal strategy π is one that maximizes the expected utility given by the Bellman equations $$U(s) = R(s, a, s') + \gamma \sum_{s'} T(s, a, s')U(s')$$

where $0 \le \gamma \le 1$ is a discount factor that determines how a reward would degrade over time, under an assumption that rewards now are preferred over rewards later.

When the reward function R(s, a, s') and the transition function T(s, a, s') are known, then the learning agent can determine the best action at any given state and therefore the optimal policy using planning algorithms such as Expectiminimax However, when the learning agent does not know R nor T, we do not directly use planning techniques. Instead, we compute the optimal policy using an active reinforcement learning algorithm such as approximate Q-learning, which is a generalization of Q-learning. Q-learning is a model-free algorithm that learns the utility values Q(a, s) associated to state-action pairs. Model-free algorithms do not need a model, including transition functions and reward functions, for learning a strategy to select actions. As the learning agent learns the utility values Q(a, s), the learning agent selects actions that maximize these values, or in some cases, it trades off maximum utility for knowledge that improves the estimates for Q(a, s) (i.e., the learning agent trades exploitation for exploration). Thus, we can approximate the utility at a state with Q-learning as:

$$U(s) = \max_a \hat{Q}(a, s),$$

where $\hat{Q}(a, s)$ is the best known estimate for the Q-value Q(a, s) defined as:

$$Q(a, s) = R(s, a, s') + \gamma \sum_{s'} T(s, a, s') \max_{a'} Q(a', s').$$

We approximate Q(a, s) because we do not know R(s, a, s') nor T (s, a, s'). Thus, instead of directly computing $$Q(a, s) = \sum_{s'} T(s, a, s') \left[ R(s, a, s') + \gamma \max_{a'} Q(a', s') \right],$$

we can approximate Q(a, s) with $\hat{Q}(a, s)$ using an algorithm called Q-value iteration that exploits that $$Q(a, s) \approx R(s) + \gamma \max_{a'} Q(a', s'),$$

where R(s) is the reward associated to the state s. Therefore, $\hat{Q}(a, s)$ can be computed by progressively updating a value every time the learning agent reaches state s:

$$\hat{Q}(a, s) \leftarrow \hat{Q}(a, s) + \alpha \left( R(s) + \gamma \max_{a'} \hat{Q}(a', s') - \hat{Q}(a, s) \right),$$

where $0 \leq \alpha \leq 1$ is a learning parameter that determines how much weight should be given to current observations versus prior evidence. Note that if α is too small, the learning agent stops learning prematurely, but if α is too large, the averages will not be very accurate.

Approximate Q-learning is a variation of this idea that reduces the need for exhaustive exploration of states to accomplish learning. To do so, approximate Q-learning estimates Q(a, s) values by working with features of action-state pairs rather than prior experiences of action-state pairs themselves. More precisely, we can approximate Q(a, s) by a linear combination of weighted features, as follows:

$$\overline{Q}(a, s) = \sum_{i=1}^{n} \theta_i f_i(a, s),$$

this way, the learning agent can estimate Q(a, s) even if the learning agent has never visited s.

Each time a learning agent visits a state-action pair, the learning agent computes the difference $$\text{difference} = \left[ R(s) + \gamma \max_{a'} \overline{Q}(a', s') \right] - \overline{Q}(a, s),$$

then, the learning agent updates the $\overline{Q}$ values and the weights using this difference $$\overline{Q}(a,s) \leftarrow \overline{Q}(a,s) + \alpha(\text{difference})$$

$$\theta_i \leftarrow \theta_i + \alpha(\text{difference}) f_i(a,s)$$

This algorithm will approximate Q(a, s) for an appropriate selection of features.

One of the inputs in the approximate Q-learning algorithm is the reward, which the learning agent samples when it lands at a state s as we describe next.

Intuitively, the learning agent should receive a positive reward when the device or application is unlocked when the authorized user wishes to use it. Similarly, it should receive a positive reward when the device or application remains locked, protecting it from adversaries, when the user does not intend to use it. On the other hand, the learning agent should receive a negative reward when the authorized user wants to use his or her device, but finds it locked and is forced to perform step-authentication, a non-user-friendly form of authentication. The agent should also receive a negative reward when the device is unlocked and left unprotected against adversaries. The first and last cases can be difficult for the learning agent to sense because the learning agent would need to sense, when the device is unlocked and used, whether the use corresponds to an authorized user or an adversary. One possible way to implement this kind of sensing is through the complementary use of an implicit authentication mechanism. However, an implicit authentication mechanism is not required.

Thus, at a state s, we can define the reward R(s) by the following functions $l^+(s)$ and $l^-(s)$ when the device or application is locked and the functions $o^+(s)$ and $o^-(s)$ when the device or application is open. The agent receives $l^+(s)$, a positive reward, when the device is locked and not used, or when the device is locked and the user fails to step-authenticate. In this case, we may assume that the device is under attack, and, therefore, it is appropriately locked. The agent receives $l^-(s)$, a negative reward, when step-authentication mechanisms succeed, thus indicating that indeed the device was incorrectly kept locked because only an authorized user would have been able to successfully step-authenticate. The functions $o^+(s)$ and $o^-(s)$ can be based on an implicit authentication score that would give $o^+(s)$, a positive reward, when the open device was used with a high implicit authentication score. The agent receives $o^-(s)$, a negative reward, when the open device is used with a low implicit authentication score, or when the device is open and not used.

Thus, we define R(s) as:

$$R(s) = \begin{cases} l^+(s) & \text{if the device is locked and there is no usage} \\ & \text{or step - auth fails} \\ l^-(s) & \text{if the device is locked and step - auth succeeds} \\ o^+(s) & \text{if the device is open and there is use} \\ & \text{(with high implicit auth score)} \\ o^-(s) & \text{if the device is open and there is no use} \\ & \text{(or use with low implicit auth score)} \end{cases}$$

For approximate Q-learning, the learning agent, in addition to being able to sample the reward associated to the current state, is able to extract features of a state. In the present embodiment, some of these features correspond to features of the context, as we describe next.

Because the number of possible contexts that a user may encounter is large, the learning agent considers features of contexts, rather than contexts themselves, in order to be able to extrapolate learning from previously observed contexts to never-before-experienced contexts. The learning agent extracts these context features from a collection of data streams $\{D_1, \ldots, D_j\}$ that the learning agent observes through a collection of smart objects and devices. For example, these include the location, motion, and WiFi and Bluetooth information observed by the user device, as well as data gathered by wearables and other sensors in buildings. From these data streams, the learning agent extracts a set of features $F=\{f_1, \ldots, f_n\}$, which are used in the approximate Q-learning algorithm.

A more detailed example of an access control framework that may be used in illustrative embodiments will now be described.

In some embodiments, an access control framework comprising access control policies determines which smart objects can be activated given a context. Policies may be specified in a logic-based language derived from the Distributed-Knowledge Authorization Language (DKAL). DKAL is one of several logic-based authorization languages that allow for the specification of access control policies and associated queries. Other logic-based authorization languages that could be used to specify access control policies in an active environment include Evidential DKAL and Security Policy Assertion Language (SecPAL).

As mentioned above, because the collection of smart objects in a user's active environment may not be owned and managed by a single entity, it may not be adequate to assume that the access control policy database is stored in a centralized fashion. Therefore, distributed-knowledge approaches may be utilized.

In such a distributed-knowledge approach, a number of principals each maintain a database of knowledge with policies. With this database of knowledge, each principal can take actions (e.g., granting or denying access to a resource) that are consistent with its own knowledge. In this model, principals can send messages to other principals that contain requests to access a resource. Requests contain knowledge that can be queried against the policies that the recipient may have in its local knowledge, as well as additional information, such as statements that grant delegated rights to access a resource.

In order to allow for the unambiguous interpretation of policies and requests, these are written in a logic-based language so that the evaluation (by a logic engine) of a request always terminates, and the decision is deterministic. Messages between principals also carry the corresponding credentials from which the authenticity of the messages can be derived by the recipient. Thus, smart objects (or their activators) can run a logic engine capable of resolving queries against policies. Such logic engines may be based on Datalog, for which sufficiently small implementations can run on an ARM-based microcontroller. Other embodiments can utilize, for example, Bluetooth radios that enable low-power devices, such as activity trackers and iBeacons. These and other smart object can be built, for example, using a system on a chip (SOC) incorporating computational capabilities similar to those of the above-noted ARM-based microcontroller.

Some embodiments implement a multiparty enforcing protocol that utilizes multiparty access key derivation. For example, one or more such embodiments can be configured to implement a secret-sharing approach in which a key K is split into n shares $H=\{K_1, \ldots, K_n\}$, such that K can be easily computed from any k shares $\{K_{i_1}, \ldots, K_{i_k}\}$, where k<n and $K_{i_k} \in H$. However, computing K from any set of shares with cardinality less than k is infeasible. Such an arrangement can be used to ensure that access keys are not stored in the user device and are only derived when access control policies have been satisfied.

Other types of multiparty enforcing protocols can be used to derive access keys in illustrative embodiments. By way of example, activated smart objects could communicate signed statements with the user device utilizing a logic-based framework, such as DKAL. The user device running the target application can then relay these statements to the verifier, which evaluates them against access control policies for the target application as they apply to the specific user. Depending on the evaluation of these combined statements, the verifier would reveal the access key to the corresponding target application.

The above-described embodiments are illustrative only, and other embodiments can include additional or alternative features.

For example, it is possible for a given embodiment to include multiple learning agents, with each such learning agent only having knowledge about a subset of all the smart objects in a user's active environment. Although such an arrangement limits the ability of individual learning agents to leverage all of the smart objects, this can be addressed by providing mechanisms for sharing information between learning agents.

As another example, an active environment can be configured to learn new access control policies and present them to the user for confirmation, leading to improved security. For example, a learning agent may learn that a user rarely needs his or her work desk activated outside of times between 8:00 AM and 6:00 PM. The active environment could present the option to the user of never allowing the activation of the work desk outside these times.

In some embodiments, it is assumed that the learning agent has a list of smart objects associated to a user and that the learning agent can communicate with each of these smart objects. When a user needs to add a new smart object to his or her profile, then the learning agent can register this new smart object to the list and update the learning agent partial model. As a result, the learning agent will have a larger set of possible actions to take in some states. In this case, the learning agent will transparently learn to take advantage of the new smart objects. Similarly, when smart objects are removed from the list, the learning agent's partial model is also updated so that the learning agent knows which actions are no longer valid.

As mentioned previously, an active environment can be used in combination with other techniques, such as implicit authentication, to give positive or negative rewards in unlocked states (e.g., states where the smart objects reveal the access key) according to the degree of certainty that the use corresponds to legitimate use. For example, in some states the device or application is unlocked, and an adversary tries to use it. If an active environment were configured to leverage an implicit authentication score to evaluate the reward, then, the learning agent would learn to avoid attacks, i.e., states with highly negative rewards associated to low implicit authentication scores.

In some embodiments, smart objects enforce access control policies surrounding their activation. This may involve, for example, smart objects enforcing policies that limit the ability of a learning agent to write a secret share for a particular application on behalf of a particular user. However, smart objects typically do not limit read access. While the shares themselves are encrypted and can only be decrypted by the target device (e.g., the user's mobile telephone), it may be possible in such an arrangement for anyone to query to see if there are activated smart objects for a particular user-application pair. This information can be used by an attacker to track the whereabouts of a user and his or her utilization of a particular application. Accordingly, alternative embodiments can be configured to address such issues by, for example, allowing for the retrieval of cryptographic material in a privacy-preserving manner.

In some embodiments, the learning agent asks for cryptographic material for a specific user-application pair only when the learning agent predicts that the particular user will use the application. Such an arrangement may allow the credential manager to learn usage patterns for the particular user-application over time. This issue can be addressed by configuring the learning agent to ask for cryptographic material for a particular user-application pair uniformly at random, with the learning agent distributing the cryptographic material for a small fraction of the queries. As a result, the real use will be hidden among a large number of fake usages.

Other alternative embodiments can be configured to allow for the use of virtual smart objects. Virtual smart objects could, for example, correspond to codes or other pieces of information that are in a user's memory. In such an arrangement, the share assigned to a virtual smart object may comprise a particular piece of information that the user knows. For example, an active environment may be configured to split an access key into three shares: one for a smartwatch, a second one for a keychain, and a third one comprising a piece of information that only the user is likely to know. These virtual smart objects could also help to address scenarios that might otherwise include insufficient smart objects. For example, when a user is in a work facility, and the active environment cannot determine with sufficient accuracy where the user is more likely to go next, the active environment could activate a smartwatch, a badge, and a virtual smart object in the user's memory instead of the smartwatch, the badge, and the user's desk.

In some embodiments, an active environment can be gradually deployed without installing special software on smart objects, possibly through the use of existing side channels. For example, smart objects having APIs or other functionality that allows a learning agent to write a share, perhaps using a side channel (e.g., leaving crumbs of information that can be retrieved later), can be used. In one possible implementation of such an arrangement, a learning agent can turn an existing WiFi access point into a smart object by writing shares as DHCP lease requests with crafted MAC addresses. The target device can then retrieve the shares using information gathered via a network monitoring program such as nmap, plus information about how to decode the side channel.

Illustrative embodiments provide significant advantages in security and usability over conventional arrangements.

For example, an active environment comprising dynamically reconfigurable sets of smart objects illustratively in a given embodiment provides a universal access management approach which a user will be able to unlock most devices or applications that he or she interacts with throughout the day in personal or business environments, without presenting passwords, gestures or biometrics. Due to the decentralized nature of some embodiments, a user could use the same system to access a personal mobile telephone, a corporate laptop, and a home workstation. The active environment can be configured to ensure that access will be denied when attempted in an unusual context or outside the normal environment of the authorized user. In addition, the active environment can provide automatic deauthentication.

The active environment in one or more embodiments is intelligent and flexible, adjusting over time to provide enhanced security and usability, yet can be used to enforce specific access control policies. It adapts to the user to avoid the need for explicit step-authentication as well as cumbersome or laborious configuration processes.

It should again be emphasized that the above-described embodiments of the invention are presented for purposes of illustration only. Many variations may be made in the particular arrangements shown. For example, although described in the context of particular system and device configurations, the techniques are applicable to a wide variety of other types of information processing systems, processing platforms, and processing device configurations. Also, different arrangements of learning agents, user devices, smart objects, verifiers, credential managers and associated processing operations may be used, as well as additional or alternative arrangements of system elements and corresponding functionality. Moreover, the assumptions made herein in the context of describing some illustrative embodiments should not be construed as limitations or requirements of the invention, and need not apply in other embodiments. Numerous other alternative embodiments within the scope of the appended claims will be readily apparent to those skilled in the art.

What is claimed is:

1. A method comprising:
   determining that a user will utilize a target application on a user device in involvement with a particular set of smart objects based at least in part on a prediction that the user will likely utilize the target application on the user device in a given active environment of the user, the particular set of smart objects being selected based on the given active environment of the user;
   requesting cryptographic material for activating the smart objects of the set from one or more credential managers;
   receiving the cryptographic material from the one or more credential managers responsive to the request being consistent with one or more access control policies for the target application that are maintained by the one or more credential managers; and
   utilizing the cryptographic material to activate the smart objects of the set, wherein each of the activated smart objects provides a verifier with a proof of involvement with the user device; and
   receiving, from the verifier, an access key that controls user access to the target application, the access key being received responsive to an evaluation of a combination of the proofs of involvement provided by two or more of the activated smart objects;
   wherein the determining, requesting, receiving and utilizing are performed by at least one processing device comprising a processor coupled to a memory.

2. The method of claim 1 wherein the determining, requesting, receiving and utilizing are performed by a learning agent running on said at least one processing device.

3. The method of claim 2 wherein the learning agent is configured to permit access to the target application in situations in which the user is likely to utilize the target application and to deny access to the target application in situations in which the user is not likely to utilize the target application.

4. The method of claim 2 wherein the learning agent includes functionality for learning target application access behavior of the user over time.

5. The method of claim 1 wherein the learning agent in generating the prediction seeks to maximize a utility function in which positive rewards are provided for permitting access to the target application in situations in which the user intended such access and negative rewards are provided for permitting access to the target application in situations in which the user did not intend such access.

6. The method of claim 1 wherein the one or more credential managers provide key information to the verifier in a setup procedure.

7. The method of claim 6 wherein the verifier is implemented at least in part as a component of the one or more credential managers.

8. The method of claim 1 wherein the verifier is implemented at least in part as a component of the user device.

9. The method of claim 1 wherein each of the smart objects independently conditions its activation on a determination that the activation is consistent with one or more access control policies for the target application that are maintained by each smart object.

10. The method of claim 1 wherein the proofs provided by the activated smart objects to the verifier are based at least in part on corresponding portions of the cryptographic material utilized to activate the smart objects.

11. The method of claim 1 wherein one or more of the activated smart objects each provides its proof of involvement to the verifier at least in part via the target application.

12. The method of claim 1 wherein one or more of the activated smart objects each provides its proof of involvement to the verifier at least in part in conjunction with a multiparty enforcing protocol carried out between the verifier and the activated smart objects and wherein the multiparty enforcing protocol is utilized to derive the access key that unlocks the target application.

13. The method of claim 1 wherein the verifier controls user access to the target application based at least in part on the proofs provided by the activated smart objects and a determination that that the user access is consistent with one or more access control policies for the target application that are maintained by the verifier.

14. The method of claim 1 wherein the set of smart objects comprises a first subset of smart objects controlled by the user and a second subset of smart objects controlled by an entity other than the user.

15. The method of claim 1 wherein a given one of the user device and the smart objects comprises one of a desktop computer, a laptop computer, a tablet computer, a mobile telephone, an automobile, a television, a set-top box, a wearable device, a smart watch, smart glasses and smart furniture.

16. The method of claim 1 wherein the particular set of smart objects are selected based on proximity of one or more of the smart objects to the user device running the target application.

17. The method of claim 16 wherein proximity of the one or more smart objects to the user device is determined based on existence of a data-link layer or physical layer network protocol utilized by the user device and respective ones of the smart objects of the set such that the smart objects of the set can provide a proof of n-hop proximity to the user device when the user device and the smart objects of the set are connected using a same physical link, where n is an integer greater than or equal to one.

18. The method of claim 1 wherein a given one of the proofs of involvement comprises at least one of:
a key share utilizable with one or more other key shares for deriving the access key; and
a digitally-signed access control statement.

19. A non-transitory processor-readable storage medium having stored therein program code of one or more software programs, wherein the program code when executed causes said at least one processing device to perform the method of claim 1.

20. An apparatus comprising:
at least one processing device comprising a processor coupled to a memory;
said at least one processing device being configured:
to determine that a user will utilize a target application on a user device in involvement with a particular set of smart objects, the determination being based at least in part on a prediction that the user will likely utilize the target application on the user device in a given active environment of the user, the particular set of smart objects being selected based on the given active environment of the user;
to request cryptographic material for activating the smart objects of the set from one or more credential managers;
to receive the cryptographic material from the one or more credential managers responsive to the request being consistent with one or more access control policies for the target application that are maintained by the one or more credential managers; and
to utilize the cryptographic material to activate the smart objects of the set, wherein each of the activated smart objects provides a verifier with a proof of involvement with the user device; and
to receive, from the verifier, an access key that controls user access to the target application, the access key being received responsive to an evaluation of a combination of the proofs of involvement provided by two or more of the activated smart objects.

21. A method comprising:
determining that a user will utilize a target application on a user device in involvement with a particular set of smart objects, the determination being based at least in part on generating a prediction that the user will likely utilize the target application on the user device in a given active environment of the user, the particular set of smart objects being selected based on the given active environment of the user; and
providing the determination to a verifier, wherein the verifier utilizes the determination to obtain a proof of involvement with the user device from each of the smart objects of the set; and
receiving, from the verifier, an access key that controls user access to the target application, the access key being received responsive to an evaluation of a combination of the proofs of involvement provided by two or more of the activated smart objects;
wherein the determining and providing are performed by at least one processing device comprising a processor coupled to a memory.

22. The method of claim 21 wherein the determining and providing are performed by a learning agent running on said at least one processing device.

23. A non-transitory processor-readable storage medium having stored therein program code of one or more software programs, wherein the program code when executed causes said at least one processing device to perform the method of claim 21.

24. An apparatus comprising:
at least one processing device comprising a processor coupled to a memory; said at least one processing device being configured:
to determine that a user will utilize a target application on a user device in involvement with a particular set of smart objects, the determination being based at least in part on a prediction that the user will likely utilize the target application on the user device in a given active environment of the user, the particular set of smart objects being selected based on the given active environment of the user; and
to provide the determination to a verifier, wherein the verifier utilizes the determination to obtain a proof of involvement with the user device from each of the smart objects of the set; and
to receive, from the verifier, an access key that controls user access to the target application; the access key being received responsive to an evaluation of a combination of the proofs of involvement provided by two or more of the activated smart objects.

\* \* \* \* \*